United States Patent
Billman et al.

(10) Patent No.: US 8,760,285 B2
(45) Date of Patent: Jun. 24, 2014

(54) WILDFIRE RISK ASSESSMENT

(71) Applicant: Wildfire Defense Systems, Inc., Red Lodge, MT (US)

(72) Inventors: Bradly Jay Billman, San Antonio, TX (US); Wayne Hartman, San Antonio, TX (US); Arti Bhide, San Antonio, TX (US); Charles L. Oakes, III, Boerne, TX (US); Elizabeth Rubin, San Antonio, TX (US); Mark Zuwala, San Antonio, TX (US); Emily Gray, San Antonio, TX (US); Sandra Sausman, San Antonio, TX (US)

(73) Assignee: Wildfire Defense Systems, Inc., Red Lodge, MT (US)

( * ) Notice: Subject to any disclaimer, the term of this patent is extended or adjusted under 35 U.S.C. 154(b) by 92 days.

(21) Appl. No.: 13/678,308

(22) Filed: Nov. 15, 2012

(65) Prior Publication Data
US 2014/0132409 A1    May 15, 2014

(51) Int. Cl.
*G08B 1/08* (2006.01)

(52) U.S. Cl.
USPC .................................................. 340/539.11

(58) Field of Classification Search
USPC ............ 340/539.11, 628, 13.24, 286.05, 293; 705/4, 44; 455/404.1
See application file for complete search history.

(56) References Cited

U.S. PATENT DOCUMENTS

| | | | |
|---|---|---|---|
| 8,650,048 B1* | 2/2014 | Hopkins et al. | 705/4 |
| 2007/0152158 A1* | 7/2007 | Garmer et al. | 250/347 |
| 2009/0265193 A1* | 10/2009 | Collins et al. | 705/4 |
| 2009/0266565 A1* | 10/2009 | Char | 169/45 |
| 2011/0153368 A1 | 6/2011 | Pierre et al. | |
| 2011/0295624 A1 | 12/2011 | Chapin et al. | |
| 2013/0073319 A1 | 3/2013 | Du et al. | |

OTHER PUBLICATIONS

Coastal Resource Mapping, "FireSmart: Wildfire Risk Assessment Application" Crmltd, 2013. <http://www.crmltd.co.firesmart-wild-fire-risk-assessment-application>, 4 pages.

Hill et al., "IT Part 4: Virtual Situation Awareness Tools" 2013. <http://wildfireworld.org.article/it-part-4-virtual-situation-awareness-tools>, 3 pages.

Keller, "Forest Fire App: Smartphone Could Help You Assess Wildfire Risk, Say BC Researchers" 2012. <http://www.huffingtonpost.ca/2012/08/15/forest-fires-app-bd-researchers-smartphone-assess-wildfire-risk_n_1778913.html>, 3 pages.

(Continued)

*Primary Examiner* — Phung Nguyen
(74) *Attorney, Agent, or Firm* — Antoinette M. Tease

(57) ABSTRACT

A system and method provide determining a wildfire risk associated with home and identifying mitigatable features located on and around the home. An inspection list of questions is presented to a user through a mobile computing device, and images are captured by a camera included in the mobile computing device. In an embodiment, an image can be captured using augmented visual assistance through a mobile application. A wildfire risk associated with the home can be determined at least based on answers to the questions in the inspection list and captured images. In another embodiment, a virtual reality game for simulating a wildfire behavior is provided. The wildfire behavior can be re-simulated during the game after removing or modifying mitigatable features on or around the home. In yet another embodiment, a system and method for determining a building status and location is provided in real-time during an active fire.

15 Claims, 26 Drawing Sheets

(56) References Cited

OTHER PUBLICATIONS

Pitney Bowes, Risk Data Suite™ Wildfire Bundle, "The Wildfire bundle identifies areas of potential risk in California to wild fires" PB, 2013. <http://www.pb.com/software/Data-Products/Insurance-Data/Risk-Data-Suite-Wildfire-Bundle.shtml>, 4 pages.

"Wildfire Management" Timmonsgis, 2013. <http://www.timmonsgis.com/industries/wildfire-management>, 4 pages.

"Wildfire Risk Assessment Portal" Texaswildfirerisk, 2013. <http://wwwtexaswildfirerisk.com/>, 3 pages.

\* cited by examiner

WILDFIRE HAZARD ASSESSMENT CHECKLIST

HOUSE/STRUCTURE

Roof

1. Roof covering or assembly is not resistant to burning ember ignitions.

2. Roof contains combustible debris/litter (leaves, pine needles, etc.) easily ignited by embers.

3. Roof materials are aging or in poor condition and/or provide openings for ember entry.

Roof Ventilation – Gable & Soffit Vents

4. Roof venting provides openings or vents that allow ember entry to attic or interior of structure.

Rain Gutters

5. Gutters are present and contain combustible debris/litter (leaves, pine needles, etc.) easily ignited by embers.

Eaves

6. Open eaves contain combustible materials (dead leaves, animal nests, etc.) or openings and/or cracks that allow ember entry to structure.

Structure – Top of Exterior Wall to Foundation

7. Structure contains openings (vents, crawl space, etc.) that will allow ember entry to interior of structure.

8. Structure has large single pane windows that could fracture and fall, allowing embers entry to interior of structure.

9. Siding materials are not ignition-resistant/non-combustible and may be contacted by flames.

10. Structure is elevated off the ground and combustible materials are present underneath structure that can be ignited by embers or reached by flames.

Structure – Attachments

11. Combustible fencing, decking, trellis, or other attachment is connected to structure that will allow flames to reach structure.

12. Combustible materials are present 'on' combustible decking that can be ignited by embers (examples: patio cushions, coco mats/planters, brooms, etc.)

13. Combustible materials are present 'under' combustible decking that can be ignited by embers or reached by flames.

*FIG. 3B*

WILDFIRE HAZARD ASSESSMENT CHECKLIST (Continued)

COMBUSTIBLE VEGETATION & MATERIALS

From Foundation to Immediate Landscaped Area (30 ft. zone)

14. Continuous combustible vegetation exists that will allow fire to reach structure or combustible attachments (decking, fencing, trellis, etc.)

15. Combustible materials exist that can ignite from embers or flame contact.

16. Additional structures present that can contribute to fire spread/behavior.

From Immediate Landscaped Area to Extent of Home Ignition Zone (30 – 100 + ft. zone)

17. Continuous combustible vegetation exists that will provide intense fire behavior.

18. Additional structures present that can contribute to fire spread/behavior.

ADJACENT SURROUNDINGS/ENVIRONMENT

A. Topographical or environmental features exist that contribute to severe wild land fire behavior.

- Due to location on slope, wildfire risk is increased.
- Due to proximity of home to canyons, valley, or gullies, wildfire risk is increased.
- Due to exposure to strong winds or other severe fire weather, wildfire risk is increased.

B. Volatile vegetation exists adjacent to Home Ignition Zone (100+ ft. from home)

C. Other residences exist within Home Ignition Zone (<100 ft. from home)

D. Area has potential for severe fire behavior.

FIRE PROTECTION CONCERNS NOT RELATED TO THE POTENTIAL IGNITION OF HOME

A. Access

- Address, driveway, or other entrance concerns could prevent timely emergency service vehicle response.
- Address numbers are too small, hard to read, or improperly marked.
- Driveway does not provide adequate access for emergency service vehicles (too narrow, long & winding, overgrown vegetation, etc.).
- Bridge is not properly rated or structurally inadequate.

B. Available Fire Suppression Resources

- No fire hydrant, pond, lake, or other potential fire suppression resources in vicinity.

*FIG. 3C*

FireShield Assessment Questions

*Structure – Top of Exterior Wall to Foundation:*

Condition 1: Does your home have single-pane windows?
-Yes
>   Recommendation: Replace single-pane windows with double-pane windows.
>
>   Report Recommendation: Replace single-pane windows with double-pane windows which can withstand the potential convective and radiant heat of a wildfire and reduce the risk of glass fracture and collapse. Any combustible vegetation or materials close to single-pane windows that could provide intense radiant heat or flame contact should be moved or substituted with smaller, fire-resistant plants. Tempered glass or double-pane windows will withstand much higher temperatures than plate glass and single-pane windows; special attention should be paid to windows overlooking slopes or combustible vegetation.

-No
-Not sure

Learn More: Single-pane windows are prone to fracture by the radiant heat from burning combustible materials/vegetation or strong, seasonal/fire-influenced winds, and allow ember entry to interior of structure.

Condition 2: Does your home have wood or vinyl siding, or any combination including these materials?
-Yes --Photo
>   Recommendation: Consider replacing with ignition-resistant material approved for a minimum exposure of one-hour on the exterior side.
>
>   Report Recommendation: Application of a fire-resistant product to wood siding can further reduce the risk of ignition from ember contact or radiant heat. When the exterior siding begins to deteriorate or requires maintenance or repair, consider replacing with ignition-resistant material approved for a minimum exposure of one-hour on the exterior side. Ensure that all cracks and crevices are sealed and all combustible vegetation, materials, and debris are kept away from the siding. Grasses around the perimeter of the home should be regularly mowed and irrigated. Consider installing a rock/gravel firebreak next to the structure. When the time comes to replace the wood siding, consider a noncombustible option. If siding is vinyl, complete replacement is advised as vinyl melts from radiant heat and raises exposure to ember intrusion or direct flame impingement.

-No
-Not sure -- photo example and photo instruction.

Learn More: Combustible siding materials threatened by blowing embers or combustible materials/vegetation in the immediate area could ignite the siding and spread into the home.

Condition 3: Is any part of your home elevated off the ground, excluding decks or elevated slabs?
Example: Pier and beam, pressed pilings, steel piers, reinforced concrete pilings, and helical piers
-Yes --photo
>   Recommendation: Keep all burnable material such as leaves and needle-cast cleaned up both under and around the perimeter of the house.
>   Report Recommendation: Keep all burnable material such as leaves and needle-cast cleaned up both under and around the perimeter of the house. Ensure that the underside of the home has sufficient setback from combustible vegetation. Consider enclosing the entire unprotected perimeter of the home with noncombustible material or a screen to protect the structure.

-No
-Not sure –photo example and photo instruction.

Learn More: This would not apply to a deck, but directed specifically to the home. Combustible materials tend to build up underneath the structure and are easily ignited by embers or reached by flame, which could then burn into the house.

*FIG. 9A*

FireShield Assessment Questions (Continued)

Condition 4: Do the sides of your home have any openings?
Examples: Missing or loose siding, cracks/gaps, uncovered holes, pet doors, vents, weep holes, vent tubes
-Yes --photo
Recommendation: All openings should be covered with 1/8-inch (maximum) wire mesh, caulking, or other suitable building material.
Report Recommendation: All openings should be covered with 1/8-inch (maximum) wire mesh, caulking, or other suitable building material; if venting, there are several brands of ember and fire-resistant varieties available to the public. Additional vents may be required to ensure proper air flow and ventilation per local building codes.
- Pet doors provide a large opening in the structure susceptible to intrusion of embers and firebrands. Install a removable cover, stored outside the home, and available to emergency response personnel to block this entry to the home in the event of wildfire.
- Although your vents are covered, the mesh openings may be too large. Ensure the screen is fire-resistant with 1/8-inch (maximum) wire mesh or replace with vents designed and approved to prevent ember or flame penetration of the structure; there are several brands of ember and fire-resistant vents available to the public.
-No
-Not sure --photo

Learn More: Flaming embers or firebrands can precede a wildfire, blowing into small spaces or openings, which can then ignite and spread into the home.

**HOUSE/STRUCTURE*

*Roof:*
Condition 5: Is your roofing cover, or shingles, made of wood or rubber?
Example: Wood shingles, recycled synthetic material (rubber, component roofing, etc.)
- Yes photo
Recommendation: As soon as possible, consider replacing the roofing material with asphalt shingles, metal, clay tile, or other fire-resistant, noncombustible materials.
Report Recommendation: As soon as possible, consider replacing the roofing material with asphalt shingles, metal, clay tile, or other fire-resistant, noncombustible materials.
- If you roof is made of clay tile, and has open end-caps, block the gaps between the clay tiles and the fascia: open end-caps will allow ember intrusion and ignition of the roof underlayment.
- If your roof is in poor condition, repair any break in the roofing to reduce the risk for ember penetration.
- No photo
- Not sure photo
Learn More: Wood or rubber roofing, or roofing in poor condition, creates the potential for embers to become embedded underneath the roofing material, ignite the roofing/wood underlayment, and spread fire into the home.

Condition 6: Does your roof have overhanging tree limbs and/or debris on it?
Example: Leaves, pine needles, or moss
-Yes --photo
Recommendation: Remove all combustible debris and litter from the roof on a regular basis.
Report Recommendation: Remove all combustible debris and litter from the roof on a regular basis, especially before and during wildfire season, paying particular attention to the roof-to-wall intersections.
-No
-Not sure --photo

Learn More: Embers could land in this material, ignite the roofing material/underlayment, and spread fire into the home. It's important to look at areas of the roof that meet siding (dormers for example) and often collect leaves and/or snow.

*FIG. 9B*

FireShield Assessment Questions (Continued)

*Roof Ventilation:*
Condition 7: Does your roof have any ventilation?
Examples: *Include pictures of vent types.
-Yes
Recommendation: All venting should be covered with 1/8-inch (maximum) wire mesh, caulking, or other suitable building material.
Report Recommendation: All venting should be covered with 1/8-inch (maximum) wire mesh, caulking, or other suitable building material; there are several brands of ember and fire-resistant varieties available to the public. Additional vents may be required to ensure proper air flow and ventilation per local building codes.
- Although your vents are covered, the mesh openings may be too large. Ensure the screen is fire-resistant with 1/8-inch (maximum) wire mesh or replace with vents designed and approved to prevent ember or flame penetration of the structure; there are several brands of ember and fire-resistant vents available to the public.

-No
-Not sure (photo example, then prompt for photo for review)

Learn More: Blowing embers or firebrands can precede a wildfire at great distances and blow into small spaces or openings which can then ignite the home.

*Rain Gutters:*
Condition 8: Does your home have gutters and are they free of debris?
-Yes
Recommendation: Remove all hazardous debris from the rain gutters on a regular basis.
Report Recommendation: Remove all hazardous debris from the rain gutters on a regular basis, especially before and during wildfire season. Consider installing fire-resistant leaf guards on your gutters.
-No
-Not sure (photo example, then prompt for photo for review)

Learn More: Smoldering or flaming debris in the gutter can ignite roofing material or the tar paper and plywood underlayment and spread into the structure.

*Eaves:*
Condition 9: Does your roof overhang (eaves) have unsealed cracks/openings or a buildup of material?
Examples: Animal nests, leaf buildup, opening between joists, rot
-Yes --photo
Recommendation: Regularly inspect the eaves and remove all fine fuels or accumulations of dead leaves and animal nesting materials.

Report Recommendation: Regularly inspect the eaves and remove all fine fuels or accumulations of dead leaves and animal nesting materials. Close any gaps in the eaves with caulking, 1/8-inch (maximum) wire mesh, or other suitable building material. Eaves, soffits, and fascia that are combustible should be enclosed with solid materials with a minimum thickness of 3/4 inch. Rafter tails shall not be left exposed unless constructed of heavy timber materials.
-No
-Not sure --photo

Learn More: These embers could ignite the eaves and any combustible material (dead leaves, animal nests, etc.) that has collected there, and then spread fire into the house.

*FIG. 9C*

FireShield Assessment Questions (Continued)

*Other Structures:*

Condition 10: Do you have any wooden structures on your property that are detached from your home?
Examples: A shed, detached garage, detached fencing, gazebos, and playsets?
- Yes – Photo

Recommendation: Be sure to clear any down and dead materials away from the structure(s), particularly before and during fire season.

Report Recommendation: Any secondary structures within 100 ft. of your home could ignite and lead fire and embers to the home. Be sure to clear any down and dead materials away from the structure(s), particularly before and during fire season. Keep down and dead material cleaned up and maintained around the property. Pay particular attention to the area between the home and the structure(s).
- No
- Not sure

Learn More: Wildfire fuels between structures should be reduced in an effort to minimize the threat of fire spreading from one structure to another. Keep down and dead material cleaned up and maintained around the secondary structure. Pay particular attention to leaves and needles that may accumulate under or around burnable vegetation in the landscaping.

Condition 11: Do you have any wooden structures that attach to your home?
Examples: Fencing, decking or wood support beams under synthetic decking, an arbor, trellis, carport?
-Yes

Recommendation: Ensure that all combustible materials and vegetation are kept clear under and around the attachment.

Report Recommendation: Ensure that all combustible materials and vegetation are kept clear under and around the attachment to prevent slow burning surface fires from reaching and igniting the attachment. Consider installing metal flashing where the attachment directly connects to the home. When the attachment requires maintenance or repair, consider replacing with noncombustible materials.
-No
-Not sure

Learn More: Combustible attachments could be ignited by blowing embers or flame contact from nearby combustible materials/vegetation and spread fire to the home.

*FIG. 9D*

FireShield Assessment Questions (Continued)

**\*\*\*COMBUSTIBLE VEGETATION & MATERIALS\*\*\***
Condition 12: Are there trees, shrubs, grass, or other vegetation within 100 feet of your home?
-Yes –photo
Recommendation: Consider replacing burnable tree and shrub species with native fire-resistant varieties. An excellent source of local vegetation recommendations can be found at www.firewise.org.
Report Recommendation: On homeowner property, trees should be thinned to a distance of 25 feet between tree crowns or grouped in islands spaced 25 feet apart. Trim lower branches a minimum of six feet above the ground if tree height permits, and ensure all accumulated dead and down material is regularly cleared. Reduce or break continuous ground fuels to minimize the risk of a slow burning surface fire reaching the structure or attachments. Consider replacing burnable tree and shrub species with native fire-resistant varieties. An excellent source of local vegetation recommendations can be found at www.firewise.org.

Taller vegetation hanging over underbrush could lead to a condition known as "ladder fuels" and increases the risk to your home. Without proper separation, this underbrush could catch fire which could ignite the taller vegetation and then set fire to the home. Limb or prune trees that overhang ground vegetation so that the lowest branches are separated vertically from the tallest shrubs or grasses by at least 10 feet. This maintenance could help prevent a ground fire from becoming a crown fire.

Seasonal grasses should be mowed low to decrease the likelihood of an ember-producing, fast-running grass fire or a slow burning surface fire igniting the home.

- 0-30 foot zone: Ensure that there is a minimum of 30 feet of defensible space around the perimeter of the home, if ownership allows. Reduce or break continuous ground fuels to minimize the risk of a slow burning surface fire reaching the structure. Trim lower branches a minimum of six feet above the ground, if tree height permits, and ensure that all accumulated dead and down material is regularly cleared away. Trim all vegetation so there is no contact with the structure (a minimum six-foot clearance is recommended). Consider installing a 2- to 3-foot rock mulch apron around the perimeter of the home and its attachments to break the continuity of fuels around the structure.
- 30-100 foot zone: On homeowner property, trees should be thinned to a distance of 25 feet between tree crowns or grouped in islands spaced 25 feet apart. Trim lower branches a minimum of six feet above the ground if tree height permits, and ensure all accumulated dead and down material is regularly cleared. Reduce or break continuous ground fuels to minimize the risk of a slow burning surface fire reaching the structure or attachments.
- 100+ foot zone: This areas vegetation should be thinned, if at all possible, by removing shorter vegetation growing under taller vegetation. Reducing densities of tall trees so canopies are not touching will reduce the threat of a fire moving quickly through the trees – a condition known as a "crown fire." Remove any dead and down material/debris that has accumulated in this area.

-No
-Not sure –photo

*FIG. 9E*

FireShield Assessment Questions (Continued)

Condition 13: Do you have any of the following materials near your home: leaf piles, a propane tank, building materials, storage items, or wood/rubber mulch?
- Yes

Recommendation: Remove any combustible materials from corners, under vegetation, and under the home on a regular basis, especially before and during wildfire season.

Report Recommendation: Combustible materials present around or against the structure increases the risk to the home. Remove buildup of leaves and needles from corners, under vegetation, and under decking on a regular basis, especially before and during wildfire season.

- Mulch: Consider replacing the combustible mulch with a Firewise option such as rock or recycled glass.
- Firewood: Stacked firewood is highly susceptible to ember ignitions. The greatest threat is for embers to become embedded, ignite the woodpile, and spread fire to the house. Move the firewood a minimum of 50 feet from the house and cover with a fire-resistant tarp, or completely enclose in a fire-resistant storage shed or garage.
- Propane: Keep the area around the propane tank clear of combustible materials and debris; a 10-foot perimeter is recommended. Consider relocating the propane tank a minimum of 50 feet from the home.
- No
- Not sure – Photo Examples

*Adjacent Surroundings/Environment*

Condition 14: Is there unmanaged vegetation (brush, trees, native grasses) beyond 100 feet of your home?
-Yes –photo

Recommendation: Working closely with neighbors on a neighborhood fire plan can greatly reduce the present fire risk.

Report Recommendation: The approaching fire may ignite fuels (structure, vegetation, etc.) on a neighboring property, increase fire behavior, and spread it to your home. Working closely with neighbors on a neighborhood fire plan can greatly reduce the present fire risk.
-No
-Not sure –photo

Learn More: Close proximity to unmanaged wildland fuels can significantly increase the risk of wildfire intrusion to the property. Volatile fuels can create extreme fire conditions which can increase the risk to a structure. Wildland fuels can generate a considerable ember storm which may fall upon any burnable material adjacent to the structure.

Condition 15: Is your home located on/near a slope; in an area with hills, mountains, or canyons; or an area prone to high winds?
-Yes –photo

Information: In a wildfire event, winds can funnel through canyons, valleys and drainages, picking up speed, and increasing the wildfire risk.
-No
-Not sure –photo

Learn More: Proximity of certain topographical or weather features, exposure to wildfire risk can significantly increase the risk to your home. Slopes, canyons and high winds substantially increase the rate of fire spread, and wildfires run faster upslope, generating greater flame lengths that can come into direct contact with the structure.

*FIG. 9F*

WILDFIRE RISK ASSESSMENT

CROSS-REFERENCES TO RELATED APPLICATIONS

This application is related to U.S. patent application Ser. No. 13/678,301, filed concurrently, entitled "Mobile Application for Risk Assessment," the disclosure of which is hereby incorporated by reference in its entirety for all purposes.

BACKGROUND OF THE INVENTION

Customers demand more of the products and services they use than ever before. They insist that the companies they deal with on a regular basis provide them greater and greater levels of accuracy and more tailored service offerings. Companies configure and operate ever increasing numbers of computer systems to achieve this. Using sources of information that have traditionally been unavailable is now expected.

SUMMARY OF THE INVENTION

The present invention relates generally to risk assessment systems. More specifically, the present invention relates to methods and systems for collecting local data related to a vicinity of a real property using at least one sensor to determine a risk of a natural hazard associated with the property. Merely by way of example, the invention has been applied to a method of assessing susceptibility of real property to a natural hazard, such as a wildfire, using a mobile computing device and a mobile application by collecting and analyzing local data. Mitigation procedures are also provided to property owners to reduce a potential damage caused by a natural hazard. Embodiments of the present invention can be applied in a simulation game to further educate homeowners about a wildfire behavior. The invention has been also applied to an underwriting process for property insurance policies and to customize the price of an insurance premium according to computed risk levels. In addition, embodiments of the present invention can be applied in assessing the status of homes during an active fire. The methods and techniques described in the present application can be applied to a variety of risk assessment systems.

According to an embodiment of the present invention, a method of determining mitigatable items on or around a real property is provided to reduce a risk of a natural hazard, in particular a wildfire. The method is performed by a data processor of a mobile computing device. The method includes providing a data processor, a memory, and at least one sensor, wherein the memory and the at least one sensor are operatively coupled to the data processor. The method also includes receiving a request at the mobile computing device to collect local data related to a predetermined vicinity of a piece of real property using the at least one sensor, wherein the local data includes information related to mitigatable items that can be mitigated to reduce a wildfire risk associated with the property. The method further includes collecting the local data using the at least one sensor, determining, using the data processor, one or more of the mitigatable items, and displaying information related to the one or more mitigatable items.

According to another embodiment of the present invention, a method determines a risk of a natural hazard, such as a wildfire, associated with real property. The method includes providing a data processor, receiving local data related to a predetermined vicinity of the property, wherein the local data includes information related to one or more mitigatable items that can be mitigated to reduce a wildfire risk associated with the real property. The method also includes computing, using the data processor, a risk level of the wildfire associated with the property using the local data and providing, to a user, the risk level of the wildfire associated with the property. In an implementation, internal proprietary data and/or external data, such as environmental data, may be included in the analysis. In another implementation, the method can be performed by a mobile computing device. In yet another implementation, the method can be performed by an insurance management system or by other systems in a server.

According to another embodiment of the present invention, a method provides an insurance policy for real property. The method includes providing a data processor, and receiving local data related to a predetermined vicinity of the property, which is collected by at least one sensor. The local data includes information related to risk factors including one or more mitigatable items that contribute to a risk of a natural hazard, such as a wildfire. The method also includes computing, using the data processor, a risk level of the wildfire risk associated with the property using the local data and determining, using the data processor, whether the risk level is less than a threshold. The method further includes issuing an insurance policy for the property with an insurance premium if the risk level is less than the threshold. If the risk level is above the threshold, a notification is transmitted to a user that the property is uninsurable.

According to another embodiment of the present invention, a method provides adjusting an insurance premium of an insurance policy according to mitigation efforts by homeowners. The method includes providing a data processor and receiving local data related to a predetermined vicinity of a piece of real property from one or more sensors. The local data includes information related to risk factors including one or more mitigatable items that contribute to a risk of a natural hazard. The method also includes identifying one or more mitigatable items from the local data and transmitting, to a user, the one or more mitigatable items. The method further includes receiving, from the user, mitigation information related to removal or modification of the one or more mitigatable items. A new risk level is computed using the mitigation information, and an insurance premium of an insurance policy is adjusted using the new risk level.

According to another embodiment of the present invention, a method provides home inspections using a mobile computing device. The method includes, receiving at the mobile computing device, a request from a user to assess a wildfire risk associated with a home, and presenting, through the mobile computing device, a plurality of questions related to features on or around the home. The method also includes receiving, from the user, answer to the plurality of questions, wherein for each of the answers, the method further includes determining whether an image of each of the features associated with each of the answers assists in analyzing the wildfire associated with the home, and thereafter, providing an instruction to the user to capture the image of each of the features using a camera in the mobile computing device. The method further includes receiving one or more images of the features on or around the home captured by the user, and determining, at least based on the answers to the plurality of questions and the one or more images of the features, the wildfire risk associated with the home.

According to another embodiment of the present invention, a method provides a virtual reality game for simulating a fire behavior. The method includes providing a computer having a processor, receiving information related to a piece of real property and a plurality of features associated with the property which affect a wildfire risk associated with the property. The method also includes displaying a graphical representation of a graphical area including the property and the plurality of features associated with the property, wherein mitigatable features of the plurality of features are displayed in the form of user-selectable icons. The method further includes activating a virtual wildfire on at least one point in the graphical representation of the geographical area. In addition, the method includes determining, using the processor, based at least on the plurality of features, one or more fire paths associated with the property during the virtual wildfire, wherein the one or more fire paths are configured to be overlaid over the geographical area. The method further includes displaying a simulation of the virtual wildfire spreading across the one or more fire paths over the geographical area, wherein spreading of the virtual wildfire is accelerated by presence of the mitigatable features on or around the property.

According to another embodiment of the present invention, a method provides data from smoke detectors. The method includes providing a computer having a processor, receiving smoke detector data from a beacon signal detector, wherein the smoke detector data is originated from a smoke detector located at a building. The method also includes determining, using the processor, based on the smoke detector data, a location and a status of the building, and providing, to the user, information related to the location and the status of the building.

According to another embodiment of the present invention, a building status analysis system is provided. The building status analysis system includes a building, a beacon signal detector, a fire damage analysis engine, and a user mobile computing device. The fire damage analysis engine can obtain smoke detector data from the building directly or indirectly via the beacon signal detector, to determine the location and status of the building during an active fire.

According to another embodiment of the present invention, an insurance management system is provided. The insurance management system includes a data processor, engines, a memory, and a communications module all operatively coupled to the data processor. The communication module and the engines are operably coupled together to perform any of the steps of methods described in the present application.

According to another embodiment of the present invention, a mobile computing device is provided. The mobile computing device includes a data processor, a memory, and a communications module all operatively coupled to the data processor. The mobile computing device also includes a mobile application which is stored in the memory. The mobile application includes a plurality of instructions, which, when executed using the data processor, perform any methods described in the present application.

According to another embodiment of the present invention, a non-transitory computer-readable storage medium including a plurality of computer-readable instructions tangibly embodied on the computer-readable storage medium is provided. The plurality of computer-readable instructions, which, when executed by a data processor, can perform any one of methods described in the present application. In an embodiment, the plurality of instructions are configured to be downloaded to a mobile computing device.

Numerous benefits are achieved by way of the present invention over conventional techniques. For example, embodiments of the present invention provide methods and systems that allow a homeowner to identify risk factors in real-time and self-mitigate risks of natural hazards associated with the homeowner's property by using a mobile computing device. Using a self-guided service provided by technologies according to embodiments of the present invention, a homeowner can identify items, objects, or features around the property that can be addressed and mitigated to minimize potential hazardous conditions surrounding the property. Since homeowners can use a self-guided computer-aided service rather than requiring professional wildfire fighters or other experts to inspect the properties, there are benefits of cost savings for homeowners and insurance companies.

In addition, embodiments of the present invention allow insurance companies and other service providers to prioritize their follow-up work with homeowners based on results of self-guided inspection. A homeowner can be provided with multi-tiered interactions with experts—by phone, video chat, or in-person follow-up inspections. Embodiments of the present invention also enable the insurance companies to tailor insurance premiums according to a computed risk level of a natural hazard risk associated with a piece of real property. Such premiums can be adjusted in response to homeowners' efforts to reduce risk levels of natural hazards associated with their homes. Therefore, homeowners can be active participants in determining insurability of their homes and insurance premiums. These and other embodiments of the invention along with many of its advantages and features are described in more detail in conjunction with the text below and attached figures.

BRIEF DESCRIPTION OF THE DRAWINGS

FIGS. 3B and 3C illustrate a wildfire hazard assessment checklist according to an embodiment of the present invention;

FIGS. 9A to 9F illustrate Fire Shield assessment questions according to an embodiment of the present invention;

DETAILED DESCRIPTION OF SPECIFIC EMBODIMENTS

Figure 1:
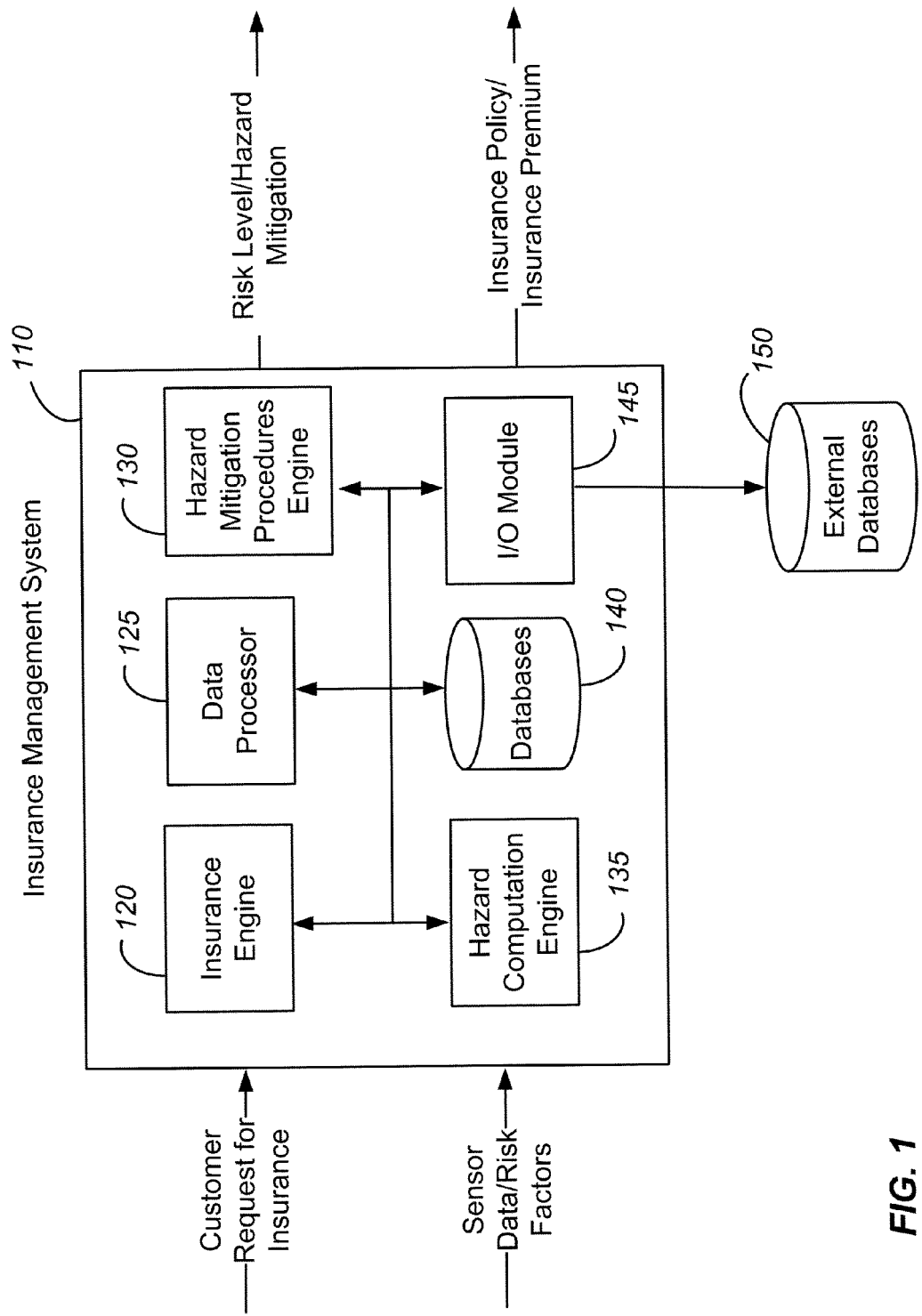
FIG. 1 is a high level block diagram illustrating an apparatus for computing a risk of a natural hazard associated with real property and for issuing an insurance policy according to an embodiment of the present invention.

Embodiments of the present invention relate to technologies to facilitate homeowners and/or renters in finding, acquiring, insuring, and/or maintaining real property. Technologies related to embodiments of the present invention support a homeowner/renter, for example, a member of the present assignee, with the initial preparation associated with the purchase of a home and/or rental of a home/apartment. Such initial preparation can include advice and counseling related to a person's ability to afford a home or apartment, development of a financial plan to facilitate the acquisition, web-enabled self-service systems (e.g., home purchase calculators) used to determine financial goals and requirements, and/or on-line member communities related to homeownership and/or rental.

After a person completes initial preparation, technologies related to embodiments of the present invention assist the person in finding suitable properties through the use of rent/buy listings including information tailored to each person's interests and background. For example, pre-approval of the person for mortgage rates and/or homeowner's/renter's insurance can be used to provide rich information content as part of the search process. On-line member communities can be used to assist users in finding property that is suitable for the particular user's interests and income.

Additionally, technologies related to embodiments of the present invention provide for assistance in the purchase/rental transaction, including obtaining a mortgage and provision of assistance in negotiating the purchase or lease. Protection of the newly acquired home or rented property is also related to embodiments of the present invention, in one of several forms including homeowner's insurance, mortgage life insurance, renter's insurance, flood insurance, personal property insurance, home security systems, home warranties, and the like.

Moreover, technologies related to embodiments of the present invention provide a person with assistance in moving to, maintaining and/or renovating, and/or refinancing the newly purchased or rented property. Thus, embodiments of the present invention relate to technologies that provide a one-stop home resource for delivering home solutions related to buying, selling, renting, and/or owning real property. In particular embodiments, members of a membership organization (e.g., the present assignee) utilize the methods and systems described herein to manage their real property interests and interact with other community members to enable new concepts related to homes and other real property.

Homes can be subject to many natural hazards, such as wildfires, floods, hailstorms, mudslides, or the like. Although natural hazards cannot be prevented, there are some preventive measures that homeowners can undertake to mitigate the risk of such natural hazards. For example, providing a defensible space zone around a home can protect it from an approaching wildfire. While homeowners can prevent or reduce a potential loss due to wildfires, they are often not aware of conditions around their homes that can increase the risk of wildfires. Insurance companies lack resources to inspect all homes prone to wildfires or other natural hazards. A lack of inspection by insurance companies and a lack of proper mitigation efforts by homeowners can be devastating for homeowners and can result in large losses for insurance companies.

Technologies according to the present invention allow a user to capture local data related to a risk of a wild fire or other natural hazards associated with the user's property in real-time. Using a mobile computing device and sensors, a user can obtain videos, photos, images with enhanced data, and/or other sensor measurements from the vicinity of the property. The collected local data can be transmitted to an insurance management system, in real-time, to determine a risk level of a natural hazard associated with the property. Alternatively, the collected local data can be transmitted to a third party, such as a professional inspection service system, for analysis. The third party, in turn, can transmit results of the analysis to the insurance management system. Additionally, a mobile computing device can include a mobile application (e.g., an application program for mobile platforms) that can be used by a homeowner to identify mitigatable items that can be removed or modified to reduce a natural hazard risk associated with the property. Thus, in embodiments of the present invention, the mobile computing device can empower homeowners to self-mitigate against natural hazards.

In an embodiment of the present invention, a mobile application that provides an augmented view can be used to guide a user, in real-time, in identifying and mitigating items around the user's property to reduce a risk of home loss due to wildfires or other natural hazards. A mobile application on a mobile computing device can provide an augmented view of an area around the property with view-finder type indicators to show a distance between objects and areas to focus on. In some embodiments, the mobile application can be used in conjunction with plant identifying applications, object recognition software, and/or external database of information. For example, the view-finder (camera/video) feature of the application can use object recognition technology to automatically identify risk factors in real-time (e.g., holes in siding) and highlight those areas on the screen. The mobile application can further provide a summary at the end of an inspection with a recommendation list for a user, other technologies, and solutions to reduce the risk of natural hazards associated with a home. The technologies in accordance with embodiments of the present invention can provide a new approach to self-mitigation for homeowners to reduce the risk of natural hazards.

For wildfires, one of the important steps in reducing the wildfire risk is proper removal of fuel around a home to create a defensible space or barrier between the home and plants or other objects that act as fire fuel. It is difficult for a homeowner to identify objects that are potential fire fuel sources or to determine a distance for clearance between objects. In an embodiment of the present invention, a mobile computing device having a camera can be provided with a mobile application. The mobile application can provide an augmented view or augmented reality that can show a proper distance from the home to plants and objects that need to be removed to create a defensible space around a home. Thus, a mobile application in accordance with an embodiment of the present invention can provide automatic distance measurements. In some embodiments, a camera in a mobile computing device can be used by homeowners to provide a real-time view of the property for experts who can further assist homeowners in identifying and removing flammable objects on or around the property.

Embodiments of the present invention can be practiced with a sensor other than a camera. For example, a mobile computing device can include a GPS receiver or other types of location detectors as a sensor, in addition or in alternative to the camera. The GPS receiver can provide GPS coordinates for a boundary around the property that a user needs to clear potential fuel sources or GPS coordinates of plants or objects that need to be removed. In some embodiments, a mobile application can include a function where a user can view images of augmented reality of how the user's property would appear after removing plants and objects that act as fire fuel. For example, photos of before and after mitigation can be compared against each other to determine an overall coverage of fire fuel around the property. Such augmented images can provide the user with information related to safeguarding the user's property against wildfires or other natural hazards.

Embodiments of the present invention can be used by a number of different individuals and entities. For example, a homeowner can use embodiments of the present invention to self-mitigate against natural hazards. Home buyers, realtors, home builders, investors, and the like can also use a mobile application in accordance with embodiments of the present invention to determine the amount of work and cost required to address risk factors associated with a home during the home purchase process. The mobile application can also be purchased and utilized by contractors, whom, in turn, can provide services to homeowners who would rather hire contractors for mitigation work. Furthermore, insurance companies can use embodiments of the present invention to provide mitigation recommendations to homeowners. Insurance premiums of insurance policies can also be adjusted in response to homeowners' mitigation efforts to reduce risk levels of natural hazards associated with their homes.

As described more fully throughout the present specification, embodiments of the present invention provide systems and methods for determining items that can be mitigated to reduce a risk of a natural hazard associated with a piece of real property and for determining insurability and an insurance premium for the property. Additional description related to these embodiments is provided throughout the present specification and more particularly below. The figures described in this application are used to illustrate embodiments of the present invention, and are not in any way intended to be restrictive of the broad invention. Embodiments of the present invention are not limited to the specific arrangements and constructions shown and described. For example, features shown in one figure can be combined with features shown in other figures, and embodiments described in one section can be combined with embodiments described in other sections of the present application.

FIG. 1—Insurance Management System

FIG. 1 is a high level block diagram illustrating an apparatus 110, referred to as an insurance management system, for processing sensor data or other risk factors to determine a risk of a natural hazard associated with a piece of real property and an insurance premium of an insurance policy for the property in accordance with an example embodiment. As illustrated in FIG. 1, sensor data or other risk factors associated with a piece of real property to be insured is transmitted to an insurance company operating the apparatus illustrated in FIG. 1. Sensor data can be obtained from one or more sensors described in the present application. The apparatus also receives a request from a customer for an insurance policy. The insurance management system 110 includes an input/output (I/O) module 145 that can receive data as well as send data back to external databases 150, which may be operated by an entity operating the insurance management system 110 or by a third party. Although not shown in FIG. 1, the input/output module 145 also interacts with a mobile computing device and sensors shown in FIG. 2 to receive sensor data, which are stored in databases 140, and to send back data to the mobile computing device.

Utilizing the illustrated inputs, a data processor 125 and a hazard computation engine 135 interact with the databases 140 to facilitate computation of a risk level of a natural hazard associated with the property based on received sensor data. Additional information from the external databases 150 and the internal databases 140 can also be used, in conjunction with the sensor data, in the computation of the risk level. The data processor 125 and an insurance engine 120 also interact with the databases 140 to determine insurability and an insurance premium associated with the property. Additionally, the data processor 125 and a hazard mitigation procedures engine 130 interact with the databases 140 to determine mitigatable items and mitigation procedures for the property to reduce the risk of natural hazards associated with the property. After analyzing the inputs, the insurance management system 110 may provide, to a user, various outputs including a risk level of a natural hazard associated with the user's property, hazard mitigation procedures to reduce the risk level, an insurance policy, and an insurance premium for the property.

While the insurance management system 110 can also include other databases, engines, systems, subsystems, or the like, some of these components are not illustrated in FIG. 1. FIG. 1 illustrates only the components that process sensor data and a request for insurance policies. Also, although external databases 150 are illustrated in FIG. 1, they are not required by embodiments of the present invention. In some embodiments, sufficient information related to sensor data processing, mitigation procedures, and insurance issuance are maintained internally within the insurance management system 110. In some embodiments, data from both internal and the external sources is integrated to provide the system operator with data that is both useful and low in cost, however, this is not required by the present invention. In other embodiments, some of the components, such as the hazard computation engine or hazard mitigation procedures engine can be included in other systems operated by a third party, such as a professional inspection company.

Figure 2:
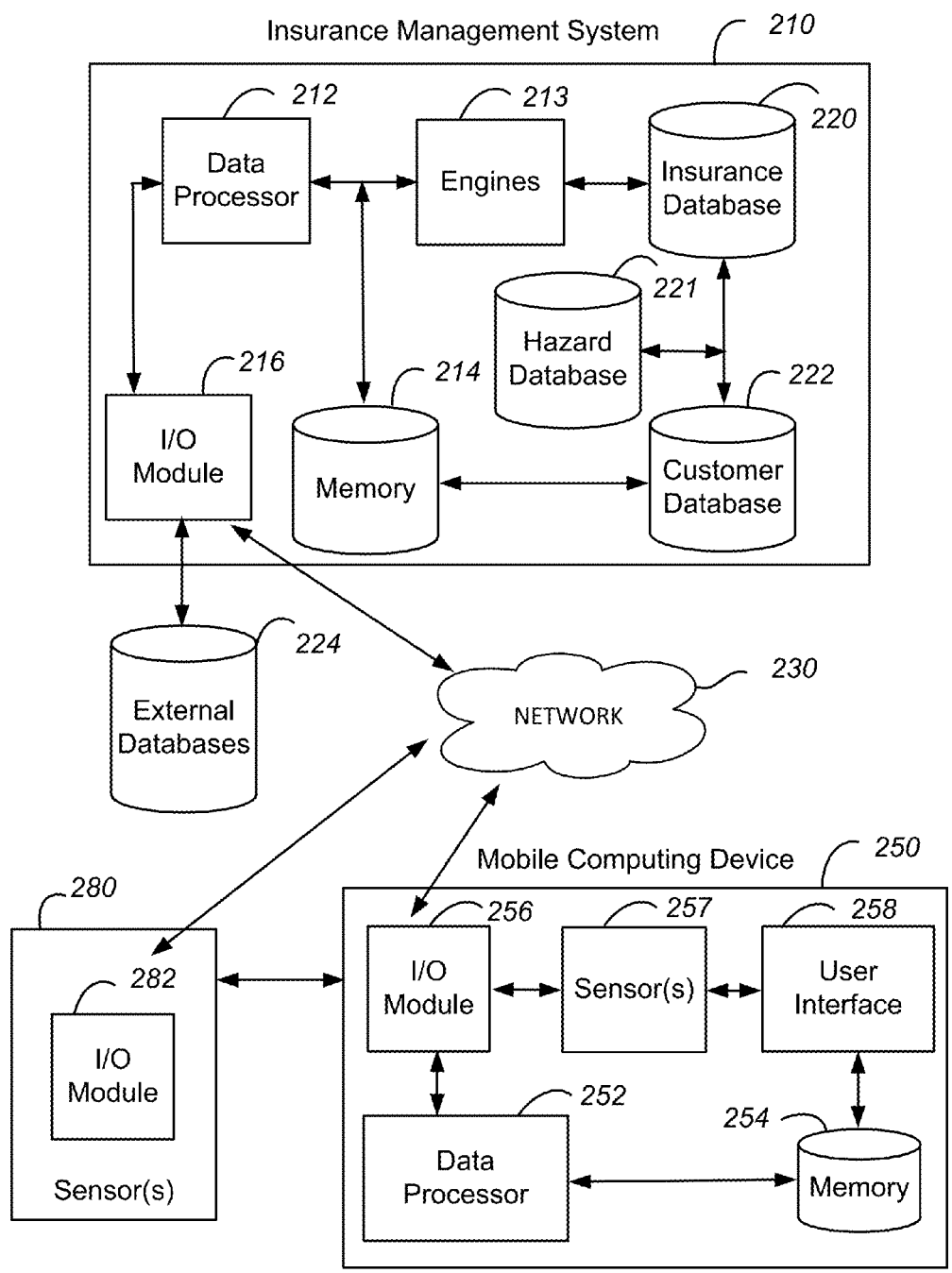
FIG. 2 is a high level schematic diagram illustrating an interaction of an insurance management system with a user and sensors according to an embodiment of the present invention.
Figure 6:
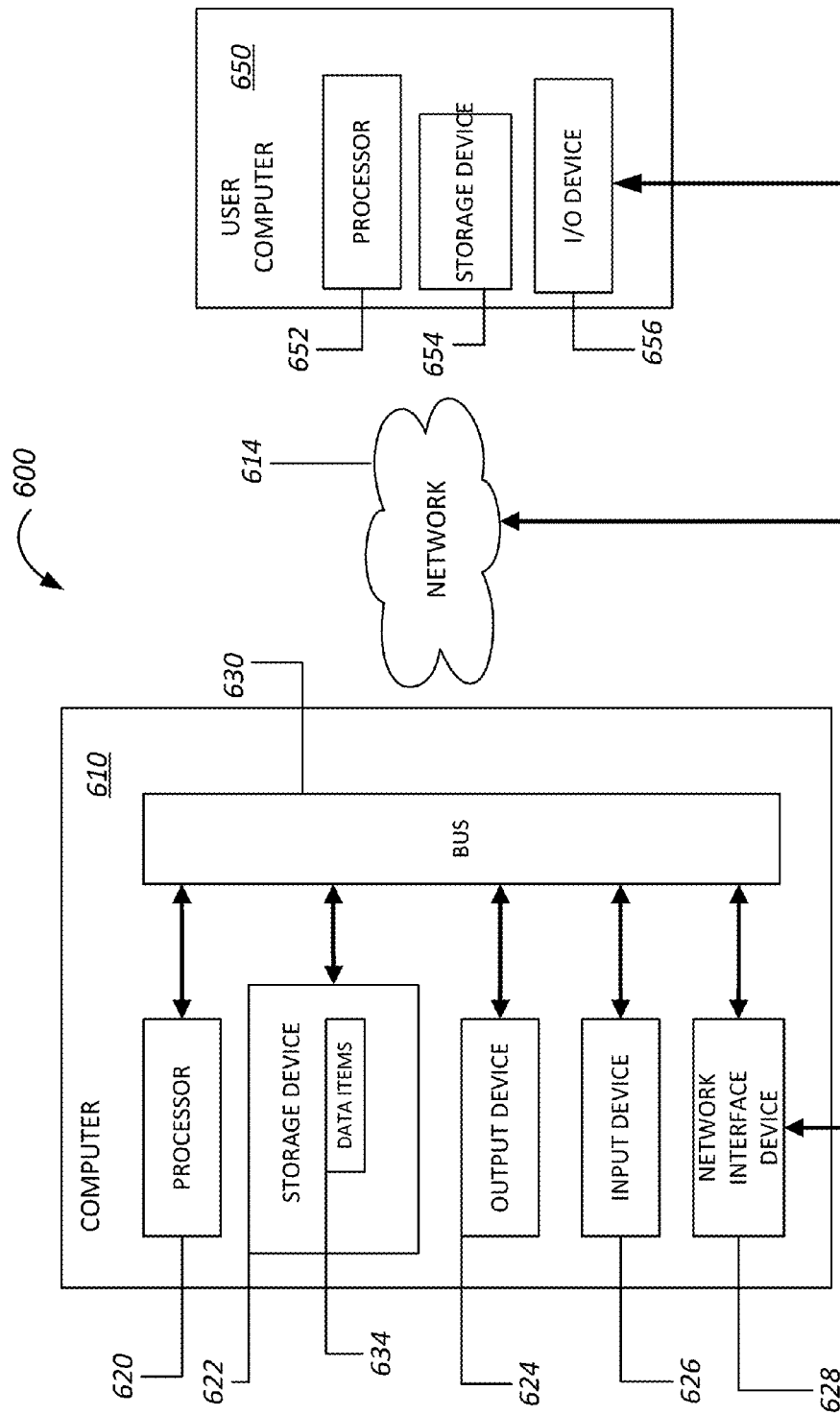
FIG. 6 is a high level schematic diagram illustrating a computer system including instructions to perform any one or more of the methodologies described herein.

FIG. 2—Interaction of Insurance Management System and User Mobile Computing Device FIG. 2 is a high level schematic diagram illustrating an interaction of an insurance management system 210 with a user according to an embodiment of the present invention. As illustrated in FIG. 2, a user operating a mobile computing device 250 interacts with the insurance management system 210 through network 230. The mobile computing device 250 can include a handheld mobile phone (e.g., iPhone™ or Android™ smart phones), a handheld mobile device (e.g., iPod Touch™), a tablet (e.g., iPad™), a PDA, a notebook computer, or the like. While an embodiment shown in FIG. 2 illustrates the use of a mobile computing device, any user computers including a desktop computer may be used to interact with the insurance management system. The insurance management system 210 includes a data processor 212, also referred to as a processor, and a memory 214. The description provided in relation to processors and memory in FIG. 6 is also applicable to the data processor 212 and memory 214. An input/output module 216 (also referred to as a communications module) is provided to enable communication between the insurance management system and external users, mobile computing devices, computers, sensors, or the like.

The insurance management system 210 also includes an insurance database 220, a hazard database 221, a customer database 222, and external databases 224, which can be operated on behalf of an insurance services provider and utilized in conjunction with other system elements. The insurance database 220 stores information related to insurance policies held by a customer. The insurance database may also contain information regarding the coverage, dates, deductibles, claims, insurance claim history, and/or payments associated with various insurance policies issued by the insurance company associated with the insurance management system 210. The hazard database 221 stores information related to hazardous conditions associated with specific properties or broader areas (e.g., neighborhood, city, county, zip code level, or the like).

The customer database 222 stores data on customers/members of an organization, which may include both existing customers and/or potential customers of an insurance company. The user of the term "member" is not intended to limit the scope of the present invention but merely to provide an example of a customer who may be benefited by embodiments of the present invention. In this sense, the use of the term member is intended to cover the term customer. The data on the member/customer may include a member's name, address, date of birth, Social Security number, credit history, and other demographic information, information regarding insurance policies held by the member, purchase history, information regarding the member's financial accounts held by the member, or the like.

The insurance management system 210 is communicatively coupled, in one example, to external databases 224, which may include additional information related to a risk of a natural hazard associated with different areas. The insurance database 220, in contrast with the external databases 224, is maintained by the company operating the insurance management system 210, typically an insurance company such as the present assignee. As described more fully throughout the present specification, the I/O module 216, the data processor 212, memory 214, insurance database 220, hazard database 221, and customer database 222 are utilized to receive inputs from a user operating the mobile computing device 250. Utilizing the received inputs, engines 213 (which can include various engines shown in FIG. 1) compute and determine a risk level of a natural hazard associated with the user's property, mitigation procedures, approval or denial of an insurance policy, and an insurance premium.

A user operating the mobile computing device 250 interacts with the insurance management system 210 through network 230, which may be the Internet. In some embodiments, the network 230 is partly or wholly a private wide area network, local area network, or the like. In an embodiment described in additional detail below, the mobile computing device 250 can include at least one sensor 257 to collect sensor data from the vicinity of the user's property. In some embodiments, the sensor data can be transmitted to the insurance management system 210 using user interface 258, which results in data transfer through I/O module 256 and network 230. The sensor data from the user can be used by the insurance management system 210 to determine whether a risk level associated the user's property is below a threshold for issuance of an insurance policy and to compute an insurance premium for the policy.

The mobile computing device 250 can receive responses such as requests for additional information from the insurance management system 210, process the received information using data processor 252, store the received and/or processed information using memory 254, and display the processed/stored information using the user interface 258. As an example, a customer of an insurance company (e.g., a member of the present assignee) can use the mobile computing device 250 to interact with the insurance company (e.g., the present assignee) through the Internet, providing and receiving information through web pages operated by the insurance company (e.g., the present assignee's website). A website hosted by the insurance management system or other systems in a server can run a software or application, which allows for instance, analysis of a risk of a natural hazard associated with a piece of real property.

In another example, a customer can download a mobile application stored in the memory 214 of the insurance management system 210 or in other systems on a server to the user's mobile computing device 250 through the Internet. Alternatively, it can be downloaded from third party sources, such as App stores. Through the mobile application installed on the mobile computing device, a user can collect sensor data and interface with the insurance management system 210 or other systems in a server. In yet another example, some of the features in accordance with embodiments of the present invention may be provided by the website and others by a downloaded mobile application.

Upon opening the mobile application and/or accessing the website for the first time, a user may be asked to log in or create a new account. Embodiments of the present invention may allow the user to enter the application without signing or registering; however, accessible features may be limited for an unregistered user. Typically, a user that already has an account and previously activated the account on an existing mobile device may be recognized so that the user is not required to log into the system each time the user launches the application or access the website.

In an embodiment illustrated in FIG. 2, the mobile computing device 250 has one or more sensors 257 in the user computing device 250 that can collect local data from the vicinity of the user's property. Any suitable sensor may be included in the mobile computing device 250. As an example, the mobile computing device 254 may include a camera and/or a GPS receiver as sensors 257 to collect sensor data such as videos, photos, other images from the property, and locations of hazardous items around the property. Other types of sensors can also be included or operatively coupled to the mobile computing device. Sensor data collected by the mobile computing device 250 can be analyzed to determine mitigatable items around the property that can be removed or modified to reduce the risk of natural hazards associated with the property.

In another embodiment, one or more sensors 280 may be deployed around the property to gather additional local data related to the vicinity of the user's property. For example, one or more sensors may be installed around the perimeter of the user's property at certain locations to continuously monitor the locations. The sensors can include, but are not limited to: soil sample sensors, thermometers, humidity sensors, wind sensors, cameras located on the property, thermal sensors, infrared and radiation sensors, lidar, animal activity and migration sensors, mobile biological sensors, vegetation and fuel loads monitors, odor sensors, chemosensors, DNA analyzers, and the like. These sensors can detect odors, dryness, temperature, moisture level in the air, or the like in the vicinity of the property. In some embodiments, the plurality of sensors can form a mesh network of sensors that can provide information related to environmental factors associated with the property.

The sensors 280 can communicate with both the insurance management system 210 and the user mobile computing device 250 via a network 230 using an input/output module 282. The insurance management system 210 and the mobile computing device 250, in turn, can analyze sensor measurements from the sensors 280 to determine a risk of a natural hazard associated with the property and to identify mitigatable items located in the vicinity of the property. The sensors can provide sensor measurements periodically, continuously, or upon a request by the user or by an insurance company operating the insurance management system 210. Additional detail related to sensors deployed around a home is described in a copending U.S. patent application Ser. No. 12/769,563, filed Apr. 28, 2010, which is hereby incorporated by reference in its entirety.

Although additional sensors 280 are illustrated in FIG. 2, this is not required by embodiments of the present invention. In some embodiments, one or more sensors included in the mobile computing device 250 are sufficient to obtain local data necessary for determining a risk of a natural hazard associated with a piece of real property and to identify mitigatable items from the property.

In embodiments of the present invention, local data obtained from one or more sensors described herein can be stored in a number of different databases. For example, the local data may be stored in the memory 254 of the mobile computing device 250. In another example, the local data may be transmitted to the insurance management system 210 and stored in the hazard database 221 and/or customer database 222. In some embodiments, the local data may be transmitted externally and stored in an external network, server, or device, such as external databases 224 or a cloud based or account based storage.

In addition, external data related to a risk of a natural hazard associated with a piece of real property can be obtained from other sources. The external data refers to data which is not local data captured by sensors in accordance with an embodiment of the present invention. As an example, the external data related to a risk of a natural hazard associated with the property can include data layers from geographical information system (GIS), which can contain all types of geographically referenced data at a macro level. Examples of external data may also include environmental conditions such as drought conditions, lightning conditions, storm surge risk data, historical fire data, or the like that may increase fire risks for the property or for a greater area in which the property is located. The external data may be accessed from external databases 224 or from a cloud based or account based storage. In some embodiments, the external data associated with properties of customers may be stored in the hazard database 221 and/or customer database 222 of the insurance management system. The external data associated with a particular piece or real property (or a greater area in which the property is located) may be also stored in the memory 254 of the mobile computing device 250.

The local data, the external data, or both may be analyzed to determine a risk of a natural hazard associated with real property or mitigatable items around the property. Analysis of the data (e.g., local data, external data, or both) may be performed by a data processor of the mobile computing device 250. Alternatively or additionally, the data including sensor measurements may be transmitted to the insurance management system 210, which, in turn, performs the analysis to determine a risk level of a natural hazard associated with real property and mitigation procedures using one or more engine 213. In some embodiments, analysis can be performed in cloud computing using a remote server. Cloud computing can be performed using a mobile computing device, a personal computer, or the like to access a server running the software or application in accordance with embodiments of the present invention.

Figure 3A:
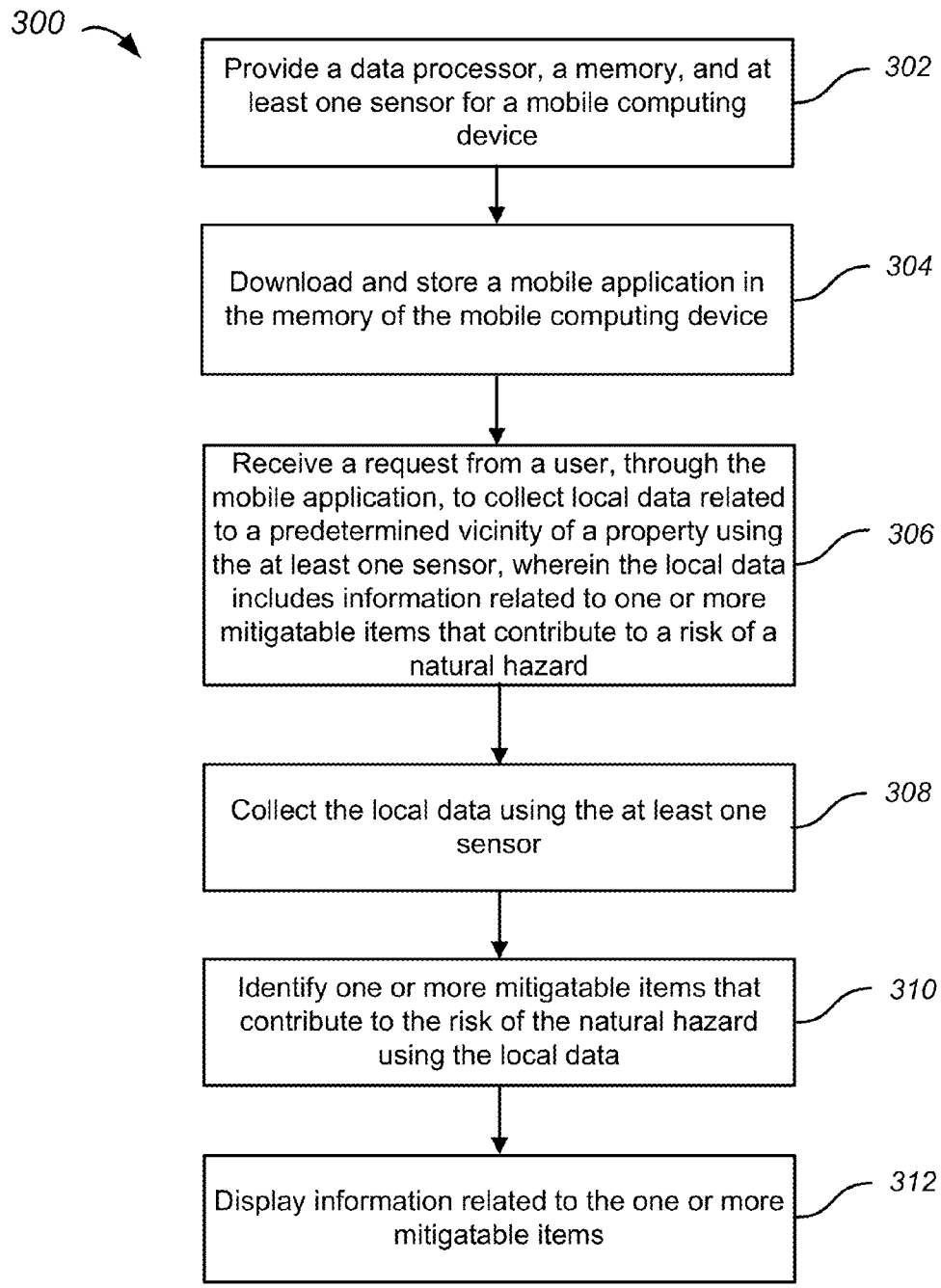
FIG. 3A is a high level flowchart illustrating a method of determining mitigatable items that contribute to a natural hazard risk associated with real property according to an embodiment of the present invention.

FIG. 3A—Assessment of Mitigatable Items Using Sensors and Mobile Computing Device FIG. 3A is a high level flowchart illustrating a method performed by a mobile computing device according to an embodiment of the present invention. In an embodiment illustrated in FIG. 3A, the method 300 can be used to identify mitigatable items around a piece of real property that contribute to a risk of a natural hazard associated with the property. As used herein, real property or property can include residential property or commercial property, such as a home, a house, an apartment, a condominium, a commercial building, or the like. Embodiments of the present invention can provide a property owner with an opportunity to minimize potential damages by addressing identified mitigatable items prior to a natural hazard.

In FIG. 3A, the method 300 includes providing a data processor, a memory, and at least one sensor for a mobile computing device (302). The memory and at least one sensor are operatively coupled to the data processor of the mobile computing device. As described in relation to FIG. 2, one or more sensors can collect local data useful in determining risk factors of a natural hazard associated with real property. As an example, the mobile computing device may include a camera as a sensor which can collect videos, photos, or other images from the vicinity of the property in real-time. In another example, the mobile computing device may include a GPS receiver to receive a GPS signal. The GPS receiver can assist a user in determining a boundary of a defensible space zone for the property and to mark positions of identified mitigatable items in the defensible space zone. In some embodiments, the mobile computing device may include one or more additional sensors, or may be communicatively coupled to additional sensors deployed around the property.

The method can also include downloading or installing, on a mobile computing device, one or more mobile applications for surveying real property (304). The mobile applications can be downloaded from the insurance management system through, for example, insurance providers' websites. Alternatively, it can be downloaded from any third party sources, such as App stores. A mobile application can be stored in a memory of the mobile computing device and operate via a data processor of the mobile computing device. Through a mobile application on a mobile computing device, a user can collect local data using sensors operatively coupled to the mobile computing device. Through a mobile application, a user can also be provided with enhanced reality of images from the vicinity of the property. A mobile application can further analyze local data to identify mitigatable items which contribute to a risk of a natural hazard as described herein. In some embodiments, local data can be transmitted from the mobile computing device to an insurance management system so that analysis of the local data can be performed by a server computer of the insurance management system. In other embodiments, local data can be transmitted to a third party, such as a professional inspection service company, which analyzes the data on behalf of an insurance company and transmits analyzed data to the insurance management system.

While FIG. 3A illustrates an embodiment where an application program for a mobile platform is downloaded to a mobile computing device, a browser-based website can be used on a mobile computing device to collect local data or to perform a risk analysis in other embodiments of the present invention.

Figure 7A:
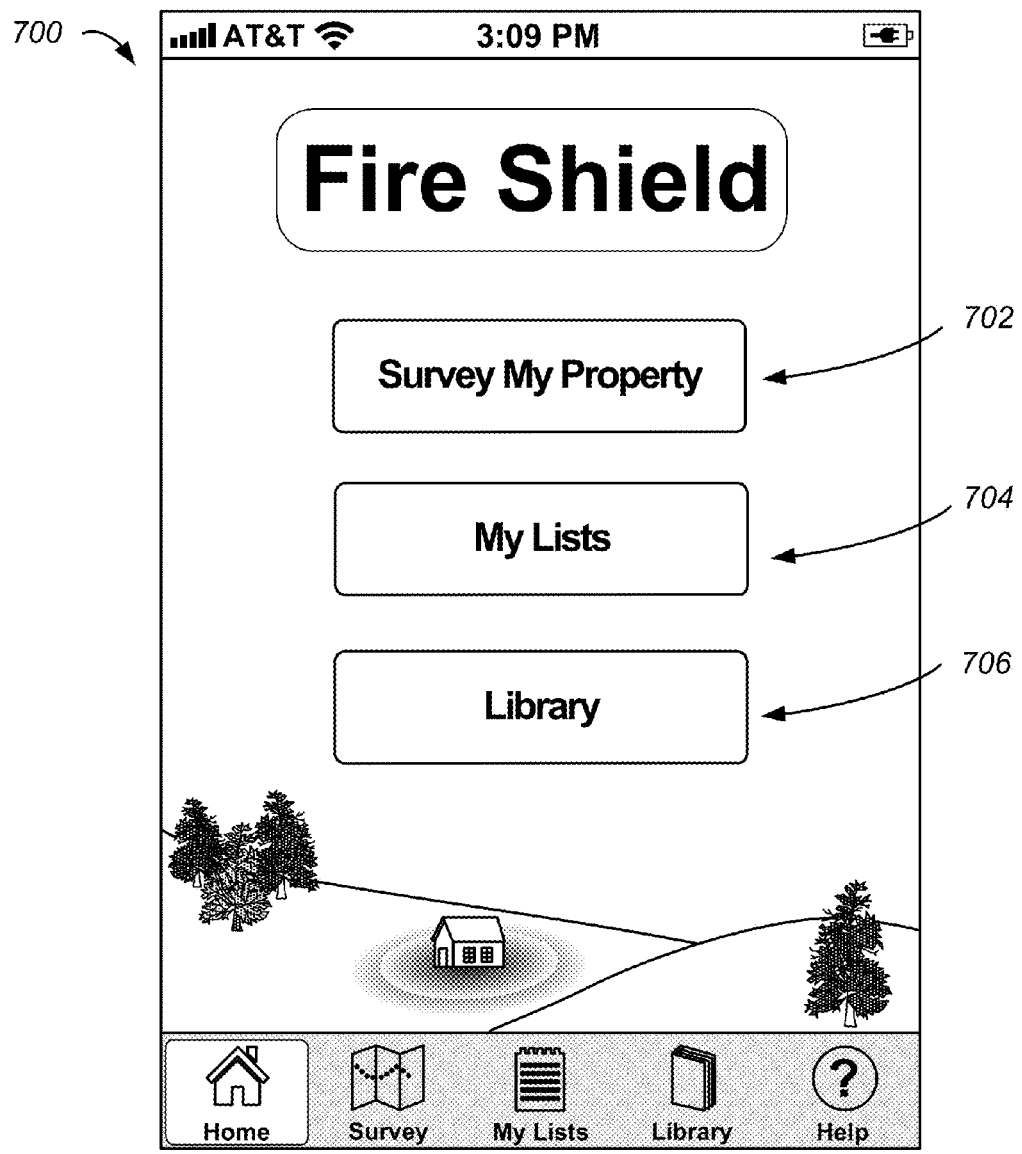
FIG. 7A is a high level schematic diagram illustrating a graphical user interface for surveying real property according to an embodiment of the present invention.

Referring to FIG. 3A, the method 300 also includes receiving a user request, through a mobile application, to survey the user's property by collecting local data within a predetermined vicinity of the user's property (306). In an embodiment of the present invention, a user request may include, for example, a selection of an icon for "Survey My Property" (shown in FIG. 7A) or a selection of a sensor for surveying the property (shown in FIG. 7B) displayed on a graphical user interface of the mobile computing device through the mobile application.

Upon receiving the user request to survey the property, the method 300 includes collecting local data using at least one sensor operatively coupled to a mobile computing device and/or deployed around the property (308). As used herein, local data refers to sensor data obtained from the vicinity of the user's property as opposed to data obtained from a broader area, such as a city, a county, a state, or the like. The vicinity of the user's property generally refers to a defensible space zone of the property. A defensible space zone is an area within a perimeter of a home where basic wildfire (or other natural hazard) protection practices are implemented, thereby providing key points of defense from an approaching wildfire. Generally, a defensible space zone is an area within about 30 feet of a home at a minimum, typically within about 100 feet of a home (or a building or a structure). As used herein, a vicinity of a piece of real property can also refer to an area surrounding a building and can also include the exterior portion or features of the building. The local data collected using one or more sensors can provide information related to risk factors, including mitigatable items associated with the property.

Augmented Images Using Camera

According to an embodiment of the present invention, enhanced reality or augmented reality can be provided by a mobile computing device through a mobile application to guide a homeowner in identifying risk factors around the user's property in real-time. The mobile application can overlay augmenting data, such as sound, text, graphics, or GPS data, on top of real-world images to be captured by a camera on the mobile computing device, thereby creating an augmented view of the real world. For example, real images shown on a screen of the camera may be overlaid with rangefinder type lines showing a distance in yards or feet. The augmented images provided by embodiments of the present invention can assist a user in determining a perimeter of a defensible space zone within which any flammable items or other hazardous conditions should be cleared. In embodiments of the present invention, the augmented view of the area surrounding the property can be displayed as a two dimensional view or a three dimensional view on the mobile computing device.

As an illustration, when a user stands by the user's house and holds up a mobile computing device with a camera lens facing towards an area of interest in the user's backyard, a real view of the area on the screen can be overlaid with rangefinder type lines showing distance markers (e.g., yards or feet). The augmented view of the area can include important points, such as a distance from a building or a boundary around the building, within which items that act as fire fuel should be cleared. In embodiments of the present invention, typically, the distance markers displayed on the screen show a boundary of a defensible space zone in the backyard (e.g., 10 feet, 30 feet, or 100 feet from the house). The user can use these distance markers (instead of manually measuring the distance) as a guide to remove or modify potentially hazardous items within the boundary.

In one embodiment, any objects displayed on the screen can be selected by the user by touching the object on the screen. The mobile application can automatically measure the distance between the user's location (e.g., the outer wall of the home) and the selected object, such as a tree, on the screen. The image displayed on the screen and the measured distance between the home and the selected object can be stored in the memory of the mobile computing device.

There are a number of other examples of distance measuring tools that can be operatively coupled to the mobile computing device. These include a laser distance measurer, a sonar distance measurer, an accelerometer, a GPS receiver, or the like. The accelerometer or the range finder can operate like a pedometer in that it can measure the bounce in a user's step to calculate the distance between two points. A GPS receiver in the mobile computing device can also be used to determine coordinates of flammable objects around the user's home. The coordinate information of the objects can be combined with an aerial map or overhead imagery of the neighborhood with geographic coordinates to calculate the distance between the objects and the home.

The distance measuring tools and augmented image tools according to embodiments of the present invention can be applied in automatically measuring dimensions (e.g., height) of trees and to properly trim the trees to reduce a wildfire risk. Through a mobile application, an augmented view of the tree can be displayed on the screen to show limbs that should be cut back. The augmented view can also display lower limbs, typically at the bottom eight feet of the tree, which needs to be trimmed to make the tree fire safe. The application on the mobile computing device can guide a user in positioning the camera to take a picture of the tree. The image of the tree, augmented with the dimensions of the tree and limbs to be removed, can be displayed to guide the user during the tree trimming process. In some embodiment, the application on the mobile computing device may also provide a simulation of the tree trimming process. As an example, an image of the tree can be displayed on the screen before the trim, followed by an image of a virtual tree after removal of appropriate lower limbs. A simulation of the tree trimming process can assist the user in visualizing a properly mitigated tree with a reduced fire risk.

In other embodiments of the present invention, a camera in a mobile computing device can provide a 360 degree view to provide a complete image of the surroundings of a home. The real view shown on the screen of the mobile computing device can be augmented with a pinpointed compass direction. The augmenting data (e.g., compass direction) can be included in the captured In addition, the real view image augmented with pinpointed compass direction can be provided through a mobile application in accordance with embodiments of the present invention. The compass direction can be included as metadata for the captured image and can be visually displayed together with the image.

In yet another embodiment, augmented images can be collected using a mobile computing device to identify latent dangers around real property. The mobile computing device can capture real-view or enhanced images of the exterior of the house to identify hazardous items, such as vent openings or cracked roof tiles which may allow entry of embers. For example, the mobile application can detect vent openings and identify whether the openings are ⅛ of an inch or smaller in diameter. In an embodiment, a live camera view can be augmented with a grid on the screen so that a vent opening size can be compared and determined based on the grid size. In another embodiment, if a mobile computing device scans an open vent on a building without any protection, a vent door or screen that can shield the vent can be drawn in the scanned image. Such an augmented image provides a user with a visual illustration of mitigation for a vent opening.

In some embodiments, augmented images collected through an application of a mobile computing device can be used to identify latent dangers around the property related to other natural hazards, such as floods. Even if the property is not located within a flood zone, the property may be subject to flooding, particularly during a torrential rain or a wind-driven rain. Conditions that promote flooding can include negative grading of a yard surrounding a house, a slope of the roof, a location of exterior doors, and the like. A homeowner's insurance policy generally does not cover floods, such as water coming off the roof and splashing back up into the house or coming down from an incline into the house. Any latent dangers around the house can be identified from augmented images of the property using technologies according embodiments of the present invention. For example, an augmented image of a house showing a slope of the roof line above an exterior door, window, or other structure openings may indicate that flooding may occur around these structural features during a torrential rain.

In some embodiments, the flood risk can be assessed using an algorithm and augmented images of the property by simulating ways that a building can be flooded based on the design of the building and the environment surrounding the building. As an example, high winds, rain fall levels (heavy, light, or the like), directional rain, wind-driven rain, or the like can be simulated using augmented images of the property. A homeowner may be informed of latent dangers identified during the simulation so that the homeowner can make changes to the home structure and/or the surrounding environment. After modifying the structure and/or surrounding environment, the flood risk simulations can be rerun to determine if the risk has been mitigated. The application can then provide a cost assessment to mitigate the flood risk. In some embodiments, after simulations, a homeowner may be advised to obtain a special line of insurance products, such as a flood insurance policy.

Slope Detector

The elevation or slope angle of a terrain surrounding the property can affect the risk of a natural hazard associated with the property. For example, a wildfire typically travels faster uphill than downhill. Therefore, the property located on top of a hill with vegetation is more susceptible to a wildfire than the property located at downhill. Also, the grade or steepness of the hill surrounding the property can also influence the speed and burn path of a wildfire.

In one embodiment, the slope angle of a terrain surrounding the property can be determined based on the camera angles and distance measurements using a camera included in a mobile computing device. The camera angles and distance can be analyzed with captured images using image analysis software. In another embodiment the present invention, a mobile computing device can further include a laser slope detector as a sensor, which may be used to determine a distance and a slope to a target object in areas surrounding the home. The elevation and slope data captured by a mobile computing device can also be used in determining a risk of a natural hazard associated with the property.

GPS Receiver

In another embodiment of the present invention, a GPS receiver in a mobile computing device can be used as a sensor to identify a boundary of a defensible space zone for a house or to identify locations of mitigatable items within the boundary. The GPS coordinates of a defensible space zone boundary and locations of mitigatable items, such as dry bushes or trees, may be physically marked on the ground with stakes and/or saved in the memory of the mobile computing device. In some embodiments, the GPS coordinates of mitigatable items may be communicated to an insurance company for record keeping purposes. In other embodiments, the GPS coordinates of mitigatable items may be communicated to a contractor who can selectively remove these items according to GPS coordinates without disturbing nonflammable, healthy trees or bushes.

Other Sensors

A mobile computing device can further receive local data from other sensors coupled to the mobile computing device or deployed around the property. As an example, a mobile computing device can include an odor sensor, such as Cyranose™, to detect odor of flammable or combustible items (e.g., paint, gasoline, propane gas leak, natural gas leak, any hidden items, or the like) around the property. As described in relation to FIG. 2, other sensors that can be deployed around the property include: soil sample sensors, thermometers, humidity sensors, wind sensors, cameras located on the property, thermal sensors, infrared and radiation sensors, lidar, animal activity and migration sensors, mobile biological sensors, vegetation and fuel loads monitors, DNA analyzer, and the like. These sensors can continuously or periodically collect local data related to the environment surrounding the property. The local data including sensor measurements can be transmitted to a mobile computing device, an insurance management system, or other systems in a server for further analysis.

Collection of Information from External Data

In embodiments of the present invention, additional external data can be combined with data obtained by the user's camera and other sensors (e.g., a GPS receiver) to analyze a wildfire risk associated with property. The additional external data can include: ecosystem data, burn history of the area, geographical data, subdivision information, or the like. In one embodiment, external data, such as elevation and other topographical map information surrounding the property, can be used to assess a wildfire risk based on the location of the property. In another example, GIS data, such as topographical mapping, can be used together with other sensor data captured by the user to provide a view of the immediate and surrounding areas of the user's property based on elevation.

Such external data can be augmented with information about the possible burn path of a fire, wind speed and direction common to the area, or the like. The augmented data can be used to simulate a fire path surrounding the user's property based on its location. Such data can be used to educate the user about the area surrounding the property and different protection zones that can be created based on the global data. In addition, the data can be used by the mobile application on the mobile computing device or by one or more engines of the insurance management system to determine a wildfire risk associated with a particular location. Additionally or alternatively, the data can be reviewed by professional inspectors or wildfire fighters associated with the insurance company to receive their feedback.

Collection of Information from Internal Proprietary Data

In yet another embodiment, internal proprietary data related to the member and the home can be obtained from a company operating the insurance management system (e.g., an insurance company). For example, a homeowner's insurance policy can include property characteristics including basic construction information related to the property and brush zones (e.g., low, medium, or heavy) surrounding the property. When a member logs on and is authenticated by the system, the member's records can be retrieved from the internal database of the insurance management system. Other types of information that can be retrieved from the internal database can include the member's address, property information, name, assessed risk score rating, previous claims related to insurance, claims made by homeowners in the neighborhood, or the like.

Identification of Mitigatable Items

Referring to FIG. 3A, the method 300 further includes identifying, by the data processor, one or more mitigatable items that contribute to a risk of a natural hazard based on the local data (310). Mitigatable items can be objects or tasks that can be modified or removed by a person at a reasonable cost and man power, as part of a routine maintenance or an upgrade of a home. Examples of mitigatable items include flammable dry bushes and trees which can be cut or dry leaves in the gutter which can be removed. Another example of mitigatable items is roof opening vents (through which embers can enter) that can be shielded or screened. The mitigatable items can be modified or removed at a reasonable cost by the owner of the property to reduce the wildfire risk. By contrast, if the property is located within a forest of dense vegetation, the forest is not considered as a mitigatable item since it cannot be removed at a reasonable cost.

Mitigatable items in the vicinity of the property can be identified in a number of different ways. As an example, they may be visually identified by a user when the user surveys the user's property with a mobile computing device as described in the present application. The user may mark the position of mitigatable items, such as a dry bush, with a stake on the ground. Alternatively, the user may mark the position of the dry bush with its GPS coordinates in the mobile computing device so that its position can be stored in its memory and communicated to third parties, such as an insurance company or a tree removal service company.

In some embodiments, if the user has questions regarding whether certain items are risk factors, the user can transmit an image or sensor measurements of the object to an insurance management system. The hazard mitigation procedures engine 130 of the insurance management system 110, shown in FIG. 1, can analyze the transmitted image to determine whether the items in the image should be removed or modified. Alternatively, the user can provide a real-time video feed or images over an area of concern, through a mobile computing device, and interact with professionals. For example, the user can consult with experts, such as professional wildfire fighters, associated with the insurance company or experts in plant species identification to receive their feedback in real-time.

In other embodiments, the object recognition software stored in a memory of a mobile computing device may be used to identify whether certain objects located around the user's property are risk factors. As an example, the object recognition software can distinguish different types of plants, including those with volatile foliage (e.g., Black Spruce) from fire resistant hardwood (e.g., Balsam Popular Aspen, Paper Birch, or the like) using images captured by a mobile computing device. According to an embodiment of the present invention, the data processor of a mobile computing device can automatically determine and identify volatile trees or other flammable items around the property as mitigatable items based on oil content in the identified trees, bark type, shape, or the like.

In some embodiments, plant identification software may be used to identify species of plants. Some plant species put on different heat signatures. Different heat signatures of plants and other objects can be detected by an infrared imaging sensor (e.g., infrared scan). In other embodiments, the plant materials can be identified through material analysis using a chemosensor, a DNA analyzer, or the like. Their identities and locations can be stored in the memory of the mobile computing device, databases of an insurance management system, a cloud or account based storage, or the like. In some embodiments, flammability of plants may be identified according to their color or size. For example, plants with dry, brown leaves are more flammable than well-hydrated, green-colored plants. Thus, flammability of plants can depend on the irrigation status of plants or recent rainfall for the region. In another example, sensors described in the present application can automatically identify mitigatable items based on sense signatures emitted by the mitigatable items, such as their odor, shape, taste, or the like.

In an embodiment, a foliage density can be measured for an area, providing a density indicator that can assist a homeowner or experts understand a wildfire risk associated with the area. In an embodiment, a foliage density of an area can be determined by creating or overlaying a grid on top of a satellite image of the area on a screen of a user computing device. Any area in the screen can be selected by a user based on the total condensed woods in the area. The more grids are selected by the user, the greater is the likelihood that the area should be thinned out. This embodiment can be achieved using an aerial map or a satellite image. Alternatively, a forward facing camera view can be used. The foliage density can be algorithmically determined using any suitable density determining algorithms. Based on the determined foliage density, recommendations can be provided to a homeowner for removal of brush at specific locations.

In another embodiment, a view-finder feature of an application can use object recognition software (e.g., Google Goggles™) to automatically identify risks around the property. Through object recognition software, a camera in a mobile computing device can be pointed towards objects, such as a shingle, siding, deck, or the like, on and around the property. Then, the software can automatically identify objects shown on the screen, detect the materials used to construct the objects, and their flammability information and ratings based on the identified materials. In other embodiments, other risk factors, such as holes in the siding or exterior surface of the home can be automatically detected, and such features may be highlighted on the screen of the mobile computing device. Such information analyzed by the mobile application can be provided as a summary at the end of an inspection with recommendations. In other embodiments, such information can be transmitted to the insurance management system or inspection services to provide recommendations for the homeowner.

In some embodiments, lasers can be used as a sensor to determine age of materials for a building. Based on laser readings of siding or roof, the mobile application (or the engines in the insurance management system) can determine the probability of a spark igniting the materials into a fire. Based on the laser readings, recommendations can be provided for a homeowner for replacement of old or flammable objects which have a high probability of igniting in the event of a fire.

Other proprietary data related to the member and home can be obtained from an internal database storing the member's purchase information using a credit card or a debit card issued by a company operating the insurance management system. For example, if the database contains information related to the purchase of shingles for a new roof three years ago, then such proprietary information can be used to identify the age and materials used for the new roof. When home inspections are performed over a period of time, the purchase information stored in the database can be correlated with new items (e.g., a shed) captured during the current inspection, which were not in existent during the previous inspection.

In addition, external data described in the present application can be analyzed together with local data captured by one or more sensors to identify one or more mitigatable items in the vicinity of the property. The external data may include macro data such as data layers from GIS, environmental conditions such as drought conditions, lightning conditions, storm surge risk data, brush fire risk data, satellite data, or the like.

Educational Material and Inspection Checklist (See, for Example, FIGS. 3B and 3C)

In embodiments of the present invention, educational material, such as a hazard assessment checklist, may be provided to a user on a website operated by an insurance company. Alternatively, educational material may be downloaded to a mobile computing device as part of a mobile application in accordance with embodiments of the present invention. In some embodiments, the checklist may be incorporated into object recognition software so that mitigatable items in the checklist may be automatically identified from images from the property. The educational material may further include case studies of homeowners who mitigated risk factors versus those who did not, the images showing the impact of the mitigation versus the impact of non-mitigation after a wildfire, current news, fires in the area, or the like. Thus, embodiments of the present invention provide a holistic approach to educating, identifying, and mitigating risk factors of natural hazards associated with real property.

An example of a wildfire hazard assessment checklist is shown in FIGS. 3B and 3C. The checklist may be used to determine susceptibility of real property to wildfire flames and embers. Many items in the checklist can be easily mitigated to significantly reduce a wildfire risk. The items described in the checklist shown in FIG. 3B include mitigatable items related to a house or structure itself. The items in the checklist shown in FIG. 3C include mitigatable items related to combustible materials in a defensible space zone around the house. The checklist shown in FIGS. 3B and 3C is merely exemplary, and other checklists can be used to mitigate the risk of natural hazards. For example, separate checklists may be provided to mitigate the risk of floods, hailstorms, mudslides, or the like.

Displaying Information and Recommendations for Mitigating Risk

Referring to FIG. 3A, after identifying mitigatable items that contribute to a risk of a natural hazard associated with the property, the method includes displaying information related to identified mitigatable items on a graphical user interface (312). The displayed information can also include mitigation procedures for modifying or removing the identified mitigatable items. For example, mitigation procedures can include recommendations for suitable vegetation for the yard or their planting location in terms of their proximity to the windows of the home, particularly if they are single pane windows. Certain types of vegetation may be predefined and recommended in areas according to their zip code or latitude and longitude coordinates. A user may be also provided with cost associated with modifying versus replacing mitigatable items.

The displayed information can further provide a link to a website which sells products that can mitigate the identified items (e.g., a screen to shield an open vent, a gutter cleaning tool, or the like). Since the user's property information, including the vent size or shape, can be accessed from augmented images or external databases (e.g., a customer database of the insurance management system), suitable products can be recommended to the user. The displayed information can also include contact information for contractors who are licensed to address the identified items. In some embodiment, social media websites, such as Yelp™, can assist members in finding suitable products or services. In an embodiment, if a user selects a specific brand of a product that is in a member shop on a website operated by an insurance company, the user who is a member of the insurance company may be offered a discounted price for the product. Thus, embodiments of the present invention can provide an integrative solution for a user in mitigating the risk of a natural hazard associated with the user's property.

In addition, a mobile application in accordance with embodiments of the present invention can provide recommendations for mitigation which are prioritized based on a user's budget available to perform mitigation work. The mobile application in accordance with embodiments of the present invention can conduct a local search for best prices in plants, supplies, and services to assist homeowners to lower the mitigation cost to fit their personal budget. For customers who are members of both insurance business and banking business with a company operating the insurance management system, the system can access the customers' banking account to assess the customers' budget. After analyzing the customer's budget, the customer can be given a prioritized list or ranking of mitigation work that is within the price-range determined by the budget analysis or indicated by the user.

In an embodiment, a bank affiliated with a company operating the insurance management system can offer a mitigation loan to a homeowner to conduct mitigation work. In some embodiments, the homeowner may be required to use the loan to hire contracted services provided by reputable contractors at a pre-determined price coordinated by an insurance company. In another embodiment, the bank can create a budget for mitigation work and set up a separate account. Money can be automatically transferred from a customer's checking account to the separate account for a selected time period until sufficient funds are saved for the mitigation work.

Embodiments of the present invention may also provide a link to a social media networking site through which a user can share information related to a risk of a natural hazard associated with a particular property, neighborhood, city, or the like. A social media networking site may be operated by an insurance company or another entity, such as Facebook™ or Twitter™. It can also be a website operated by government, such as Firewise™. A social media networking site can also be used by members to invite others to place a bid on a project (e.g., trimming bushes). In another embodiment, an insurance company can provide a website through which members can share information, advice, and recommendations for mitigating the wildfire risk. The website can also provide information related to programs available in town, such as a free tree trimming service, for the community. Thus, embodiments of the present invention provide integrative solutions to problems rather than merely providing advice to users.

In embodiments of the present invention, mitigatable items, mitigation procedures, and other associated information may be stored in any suitable database. For example, the mitigatable items may be stored in a database or memory of a mobile computing device or transmitted to an insurance management system and stored in its databases or in a server. In another example, the mitigatable items and associated information may be transmitted externally and stored on an external network, server, or device, such as a cloud based storage or an account based storage.

Reminders and Alerts

Mitigating against natural hazards is an ongoing process which should be performed periodically or continually. As an example, dry bushes surrounding the home must be cut or control-burned periodically to safeguard a home against a wildfire. In an embodiment of the invention, a reminder for mitigation can be communicated to a user through one or more communication channels, including a mobile application, a web browser accessible through the Internet, short message service (SMS) text message, multimedia message service (MMS) message, electronic mail (e-mail), telephone call, Voice over IP (VoIP) communication, and the like. A reminder can be provided periodically (e.g., monthly, quarterly, or the like) to reassess risk factors around the property.

In some embodiments, an alert can be transmitted during a particular hazard season. As an example, an alert can be transmitted to a homeowner during a wildfire season. The alert may further include information related to current locations of wildfires in a greater area (e.g., neighborhood, zip code, city, or county in which the property is located). The alert may further include mitigation procedures and recommendations. As an example, an alert may include an inquiry as to whether a homeowner has dealt with previously identified mitigatable items (e.g., an open vent). The alert may further provide an immediate solution to the problem (e.g., suggesting a link for a website or store that sells a product to shield the open vent).

A number of other events can be alerted to customers. These include, for example, pre-fire season mitigation reminders, red flag warnings, burn bans in effect, evacuation plans, time to refresh property assessment, local brush pick-up services, fire notice reports, in fire perimeter reports, or the like. In the event of an active fire, an evacuation route can be provided based on inputs from RSS feeds of fire locations, local fire authorities, or the like. In other embodiments, alerts can be provided through the application or other modes of communication to inform homeowners regarding the status of their homes during an active wildfire. These alerts can be provided in real-time or periodically as appropriate for the events.

In an embodiment of the present invention, reverse 911 data can be harvested to fully determine areas and customers to alert. The reverse 911 alerts, which are provided by a public safety communications system, do not adequately communicate emergency situations to people in a given area. For example, the reverse 911 alerts miss people who live outside of the geographic boundary of the alert or those who are not listed in the public domain information (e.g., phone numbers and zip codes). The reverse 911 data can be harvested to determine customers who may not have been alerted, but should be included in an evacuation call. The reverse 911 data can be augmented with other sources to fully alert those who are in need of evacuation or warnings via, for example, mobile application alerts. In some embodiments, social media or other channels can be used to broadcast alerts to the customers.

While FIG. 3A illustrates the use of a mobile application and a mobile computing device for determining mitigatable items from local data and/or external data, the data may be transmitted to an insurance management system for analysis. After determining mitigatable items from the data by the engines in the insurance management system or via cloud computing using a remote server, this information may be provided to a user via a mobile application or on a personal web page that the user can access via a web browser.

It should be appreciated that the specific steps illustrated in FIG. 3A provide a particular method of processing local data to determine mitigatable items of a natural hazard associated with real property according to an embodiment of the present invention. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
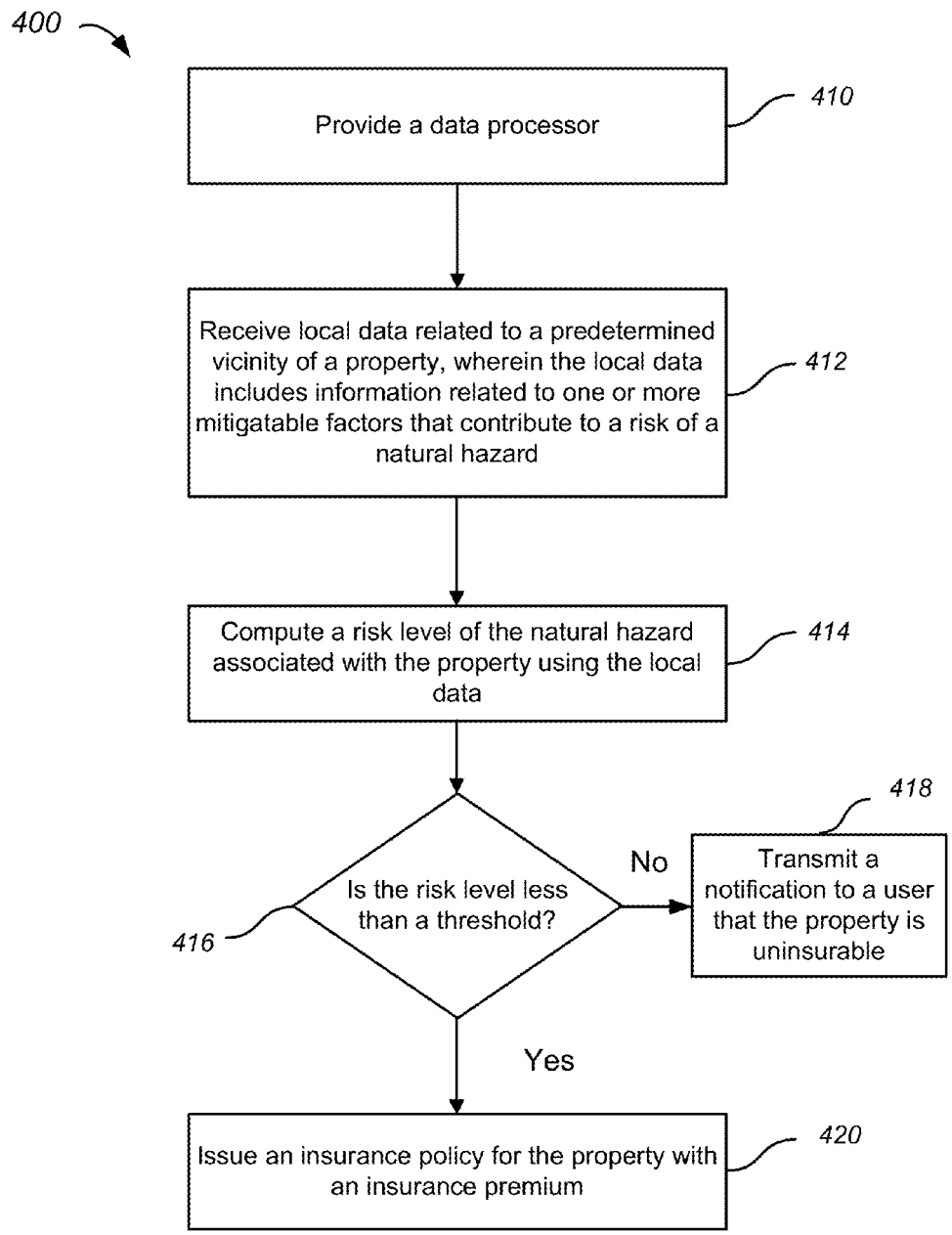
FIG. 4 is a high level flowchart illustrating a method of issuing an insurance policy according to an embodiment of the present invention.

FIG. 4—Risk Assessment and Insurance Policy Issuance

FIG. 4 is a high level flowchart illustrating a method of issuing an insurance policy for real property according to an embodiment of the present invention. The method 400 includes providing a data processor (410). The data processor may be a processor in a mobile computing device or a server computer in an insurance management system illustrated in FIGS. 1 and 2. The method includes receiving local data related to a predetermined vicinity of real property, wherein the local data is collected from one or more sensors described in the present application (412). For example, a sensor may include a camera, a GPS receiver, an odor sensor, a wind sensor, a temperature sensor, a humidity sensor, or the like. In an embodiment of the present invention, one or more sensors may be incorporated in the mobile computing device. In other embodiments, one or more sensors deployed around the property can be used to collect local data.

As shown in FIG. 4, the method further includes computing, by a data processor, a risk level of a natural hazard associated with the property based on the collected local data (414). In one embodiment, the local data collected by one or more sensors described in the present application can be used to calculate a risk level of a natural hazard associated with real property. In another embodiment, additional information related to the property and its surrounding neighborhood can be used in the computation. The additional information can be obtained from third party data providers, public databases, or government databases. As an example, by entering a property address on a website operated by a third party data provider, the property building details and materials (e.g., stone versus wooden exterior, roof material, or the like) can be obtained.

In yet another embodiment, internal proprietary data related to the member and home can be obtained from a company operating the insurance management system 110. An insurance company holds proprietary information about members and their homes. For example, a homeowner's insurance policy can include property characteristics including basic construction information related to the property and brush zones (e.g., low, medium, or heavy) surrounding the property. In addition, insurance claims from homes in the surrounding areas can be retrieved to evaluate a wildfire risk associated with the member's home. In an embodiment, when a member logs on and is authenticated by the system, the member's records can be retrieved from the internal database of the insurance management system.

In embodiments of the present invention, any gap in information related to the property can be presented to a homeowner, for example, through an augmented reality using a mobile application. Feedback can be obtained from the homeowner in real-time to satisfy the gap of information. For example, if the insurance management system cannot determine whether the exterior of a house is made of limestone, an augmented image of the exterior of the house can be displayed on a graphical user interface of the homeowner's mobile computing device. The augmented image may be presented with a question with answer choices from which a homeowner can select. The homeowner can provide feedback to the insurance system by clicking an answer choice on the graphical user interface. In another example, if an image of a house (e.g., an aerial image) appears to indicate that the roof has been replaced with an asphalt shingle roof (as opposed to a wooden roof as indicated in the current insurance policy records), then the image of the roof can be displayed for the user with a request for verification. When the user verifies that the roof has been replaced with a fire resistant roof (e.g., asphalt shingle), the insurance management system can update the user's information in a database and perform an updated risk computation to adjust an insurance premium for the user.

Additional information about the property can be also obtained from others based on social media or other suitable techniques. A person living in or passing by a location can provide data inputs used by the system described herein. For example, photos or other information related to a piece of real property or location can be obtained through social media sites, and such data can be prioritized to improve the quality of information related to the property or location. The additional information can be used together with the local data collected from one or more sensors to accurately assess a risk of a natural hazard associated with the property.

In another embodiment, additional information related to a piece of real property or the surrounding neighborhood can be aggregated from various users through a mobile application of their mobile computing device. As an example, a user passing by a neighborhood can provide augmented images of the neighborhood using the mobile application in accordance with embodiments of the present invention. The user may be a street car driver (e.g., Google Street View™ drivers) hired by a company or any consumers who may be interested in collecting and selling data to interested parties. Google Street View Maps™ or other user gathered maps can be augmented with augmenting data (e.g., distance markers, slope markers, marking dangerous or flammable objects, or the like) by using a mobile application in accordance with embodiments of the present invention. The augmented images can be provided through an input portal provided by an insurance company or a professional inspection service company. The users can provide the augmented images to the insurance company or the professional inspection service company for a fee or free of charge. The user-generated information can improve the quality of information related to a particular piece of property or its surrounding neighborhood.

In other embodiments, data layers from geographical information system (GIS) may be utilized, in combination with local data obtained from sensors, to calculate a risk of a natural hazard associated with the property. A GIS is a data system designed to capture, analyze, and present all types of geographically referenced data. The GIS can be used to combine layers of information related a selected geographic location to provide a better understanding of the location. For example, GIS data may include storm surge risk data, brush fire risk data, population concentration data, data related to different business measurements, precipitation data, satellite images, local weather, or the like. In an embodiment, the GIS data can be fed into a mobile application and can be combined with local data related to a specific piece of property captured by sensor measurements. As an example, the GIS data may indicate that the area in which the property is located is under drought. However, the local data captured by one or more sensor may indicate that the property is irrigated and has fire resistant vegetation surrounding the property. In embodiments of the present invention, the GIS data may be presented on a map. The GIS data may be overlaid over a local map generated by a user's mobile computing device. By overlaying GIS data layers over local data, any gap in information related to the property or its surrounding can be filled.

In some embodiments, different jazz technology data layers can be used to assess a risk of a natural hazard at a macro level. The macro level data layers may include information related to areas far beyond a defensible space zone of a home, for example, beyond 100 feet, a half of a mile, a zip code level, or the like. For example, a macro level data layer may provide information related to a certain type of vegetation that predominates in, for example, Southern Texas or Northern Texas where the property is located at. In another example, a macro level data layer may indicate that a high density of combustible vegetation spans continuously for many miles around the property. The macro level information for a broader area surrounding the property can be combined with local data to build a virtual house and a mosaic of information to better assess the overall risk of a natural hazard associated with the property as well as a greater area surrounding the property.

All of the local data and other data layers can be stored in a database of an insurance management system, in the memory of the computing device, or in an external network or a server. Using the available data, a proprietary data layer that measures risks at the macro level and specific property level can be created by an organization operating the insurance management system. The proprietary data layer can be commercialized by the organization by allowing interested parties (e.g., other insurance companies, realtors, builders, government, homeowner's association, or the like) to access the proprietary data layer for a fee. In an embodiment, the proprietary data layer can be provided with a certification by the organization so that purchasers of the proprietary data layer can be assured of the quality and accuracy of the data layer.

In embodiments of the present invention, any suitable computing algorithm may be used to compute a risk level of a natural hazard associated with a piece of real property. In some embodiments, an algorithm may be developed to correlate types of properties more susceptible to wildfires by analyzing conditions that fueled wildfires during previous disasters. Data analyzed in developing an algorithm may include a density of neighboring properties surrounding the property, a density or type of vegetation surrounding the property, burning characteristics of different plants, amount of asphalt between properties, direction of prevailing wind, geographical features such as presence of a body of water (e.g., river), or the like. Such data can provide information related to conditions that promote ignition or spread of a wildfire.

As an illustration, characteristics of Santa Ana winds in Southern California and the pattern of damage caused by the wind are analyzed to develop an algorithm to predict a risk level for real property in or around the path of Santa Ana winds. Such an algorithm may be used to identify specific pieces of real property that are more susceptible to wildfires. In addition, an algorithm may also be used to simulate a scenario of how a wildfire will approach and damage the property. The simulation may also include how removing risk factors would affect the wildfire risk. The algorithm can also be used to develop an effective evacuation plan as it can forecast how a wildfire will behave in certain areas.

In an algorithm, presence of any mitigatable items in the checklist discussed in, for example, FIGS. 3B and 3C may be added as risk factors. Additionally, presence or absence of features described in "Adjacent Surroundings/Environment" and "Fire Protection Concerns Not Related to the Potential Ignition of the Homes" in the checklist can be considered in the computation as risk factors. Some of these features in the checklist are not typically mitigatable by a homeowner.

A risk level of a natural hazard associated with real property can be computed using any suitable method. As an example, a risk level can be computed and quantitatively indexed on a scale of 1 to 100 (or any other suitable ranking), semi-quantitative (e.g., high, medium, or low), or the like. As an illustration, the presence of mitigatable items on real property and the presence of non-mitigatable conditions shown in the above checklists may be assigned various points. After the property is surveyed using methods and systems described herein, points corresponding to each item or condition may be added if they are present. The points can be scaled to provide an indexed risk level of a wildfire associated with the property. In embodiments of the present invention, the computed risk level is then provided to the user on a graphical user interface or communicated to the user using any suitable communication modes.

After computing a risk level of the property, the risk level is compared to a threshold (416). If the risk level of a natural hazard associated with the property is greater than the threshold, then a notification is transmitted to a user that the property is uninsurable (418). If the risk level of a natural hazard is less than the threshold, then a user may be notified via any suitable communication channels. The notification may include an offer or an issuance of an insurance policy with an insurance premium which is correlated with the risk level of the property (420). In embodiments of the present invention, an insurance policy may be a homeowner's insurance policy or a special line of insurance policies, such as a wildfire insurance policy, a flood insurance policy, or the like.

In some embodiments, the analysis of the risk level of a natural hazard is performed upon request, whereas in other embodiments, it is performed on a real-time basis, running behind the scenes. When a user is a potential buyer, a realtor, or an investor who is interested in real property, the user may input an address of the property into a website operated by an insurance company, and the results including insurability and an insurance premium may be presented to the user.

It should be appreciated that the specific steps illustrated in FIG. 4 provide a particular method of issuing an insurance policy for real property according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
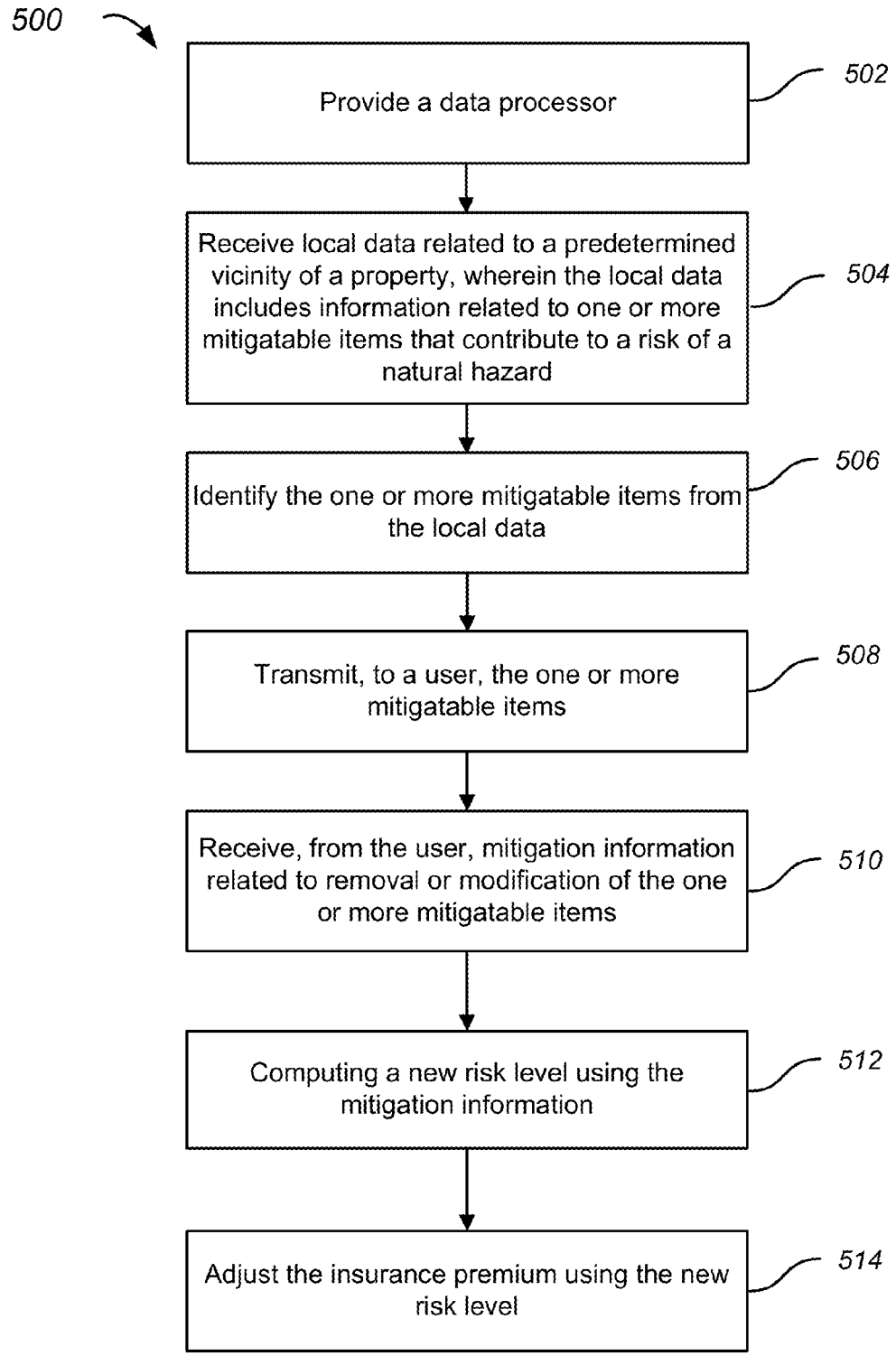
FIG. 5 is a high level flowchart illustrating a method of issuing an insurance policy according to an embodiment of the present invention.

FIG. 5—Adjustment of Insurance Premium

FIG. 5 is a high level flowchart illustrating a method of adjusting an insurance premium for a piece of real property according to an embodiment of the present invention. In evaluating a new application for property insurance, systems and methods in accordance with the present invention can be used to determine a risk level of a natural hazard associated with the property. If the risk level is above an acceptable range according to an underwriting algorithm, then an application for a new policy may be declined. If it is determined that the risk level can be reduced through removal or modification of mitigatable items or hazardous conditions, then a new policy may be issued with a condition that mitigatable items will be addressed within a predetermined period of time. Similarly, the property insurance renewal can be conditional on the homeowner mitigating hazardous conditions identified by systems and methods in accordance with the present invention. Thus, a homeowner can take a proactive role in reducing a risk level of a natural hazard associated with the property and an insurance premium. An insurance premium for an insurance policy can be lowered for the property according to the reduced risk level, which, in turn, will provide an incentive for a homeowner to continuously mitigate potential risk factors surrounding the property.

As shown in FIG. 5, the method 500 includes providing a data processor (502). The data processor may be a processor in a mobile computing device or in a server computer in an insurance management system illustrated in FIGS. 1 and 2. The method includes receiving local data, collected from one or more sensors, related to a predetermined vicinity of the property (504). The received local data comprises information related to mitigatable items associated with the property and its vicinity. The method 500 further includes identifying the mitigatable items from the local data (506). As discussed in relation to FIG. 3A, the mitigatable items may be identified by the user visually or by technologies described in the present application. The information related to the mitigatable items are displayed on a graphical user interface or transmitted to the user via any suitable communication channels (508). Additionally, external data may be analyzed in conjunction with the local data to identify mitigatable items and for risk assessment.

Upon receiving information related to mitigatable items, the user can remove or modify mitigatable items to reduce a risk of a natural hazard associated with the user's property. As an example, if the user receives information that combustible bushes exist within a 30 feet zone of the house or that an open roof vent increases a risk of ember entry into the home, then the user can choose to remove the combustible bushes and to shield the open roof vent. After mitigating items identified by the system, the user may transmit mitigation information—evidence of mitigation efforts to an insurance company in the form of a photo, a video, other images, or the like (510). After receiving mitigation information from the user, a data processor and a hazard computation engine 135 can re-calculate a new risk level using the mitigation information submitted by the user (512). Based on the new risk level, an insurance premium calculated based on pre-mitigation information may be adjusted using the new risk level of a natural hazard associated with the property (514), other external data (e.g., GIS data layers), or the like. Thus, by being proactive and mitigating hazardous conditions, a homeowner can be an active participant in determining insurability and an insurance premium associated with the property.

Embodiments of the present invention can also be applied to other types of insurance policies or government taxes. Safety of an individual property is dependent upon safety of the overall neighborhood. Mitigation efforts of an organization in a neighborhood, such as a homeowner's association, may be taken into consideration in computing an insurance premium.

For example, the overall risk of the neighborhood can be assessed from aerial images. When it is determined that the overall risk of a neighborhood has been decreased because of a homeowner's association's mitigation efforts (e.g., trimming dry trees around the neighborhood), an insurance premium may be reduced for homeowner's association insurance as well as for individual policies for houses within the neighborhood. Therefore, mitigation efforts can be rewarded at the organization level as well as at the individual level.

To encourage mitigation efforts for all members at the organization level, a centralized web page can be created for an organization (e.g., a homeowner's association) so that mitigation efforts by individual households can be displayed on the website. Through a centralized website or a social media website, other members can review the mitigation efforts by a homeowner and can score the homeowner's readiness for natural hazards, such as wildfires. Such a centralized website would create a peer pressure and incentives for all members of the homeowner's association to reduce or remove any mitigatable items around their individual homes and the neighborhood. In some embodiments, users who reduce the risk of natural hazards may be rewarded in the form of a property tax break from the government. In other embodiments, users may be awarded with a gold star rating or ranking as a member of the insurance company for their mitigation efforts.

Mitigating a risk of a natural hazard is an ongoing process, and conditions around the property are reassessed continuously or periodically (e.g., daily, weekly, monthly, quarterly, or the like). Since the risk of a natural hazard can be assessed in real-time through telematics technology described in the present application, insurance premiums can be adjusted, in real-time, continuously or periodically according to an updated risk level. The risk level may also be updated after mitigation. In some embodiments, a variable premium which fluctuates over time may be provided depending on updated conditions surrounding the property.

It should be appreciated that the specific steps illustrated in FIG. 5 provide a particular method of adjusting an insurance premium according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 7A-7D—Surveying Real Property Using a Mobile Application

FIGS. 7A through 7D are high level schematic diagrams illustrating a graphical user interface displayed on a mobile computing device. Fire Shield shown on page 700 in FIG. 7A can be used to survey real property to determine mitigatable items on or around the property according to an embodiment of the present invention. The graphical user interface displays several icons that a user can select: "Survey My Property" 702, "My Lists" 704, and "Library" 706. The "Survey My Property" icon 702 can be selected to identify mitigatable items on or around the property using sensors described in the present application. The "My Lists" icon 704 can be selected to view a stored list of mitigatable items detected by the sensors. The "Library" icon 706 can be selected to review a wildfire hazard assessment checklist or other information related to wildfires.

Figure 7B:
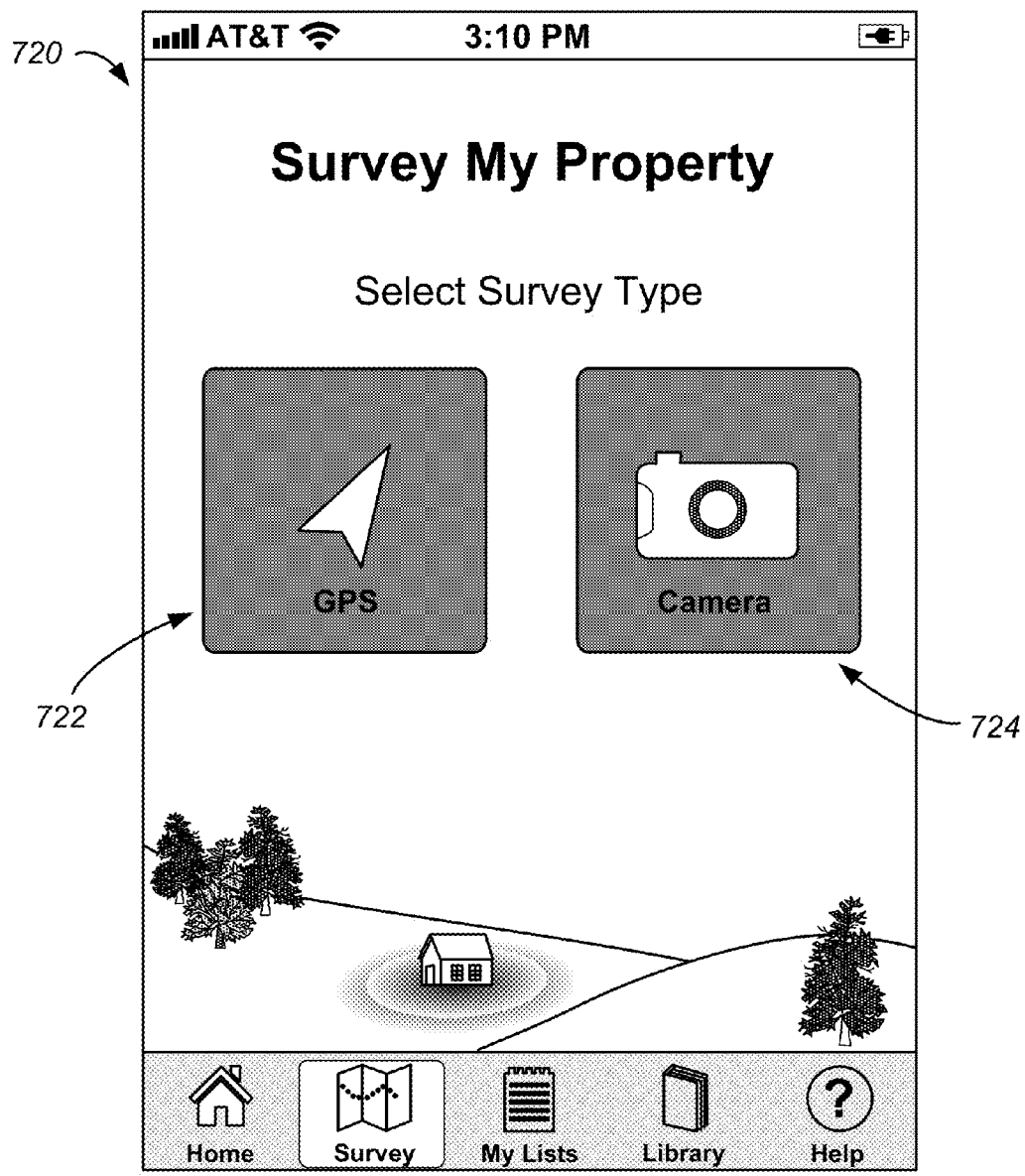
FIG. 7B is a high level schematic diagram illustrating a graphical user interface for surveying real property according to an embodiment of the present invention.

When the "Survey My Property" icon 702 is selected by a user, a page 720 shown on FIG. 7B is displayed on a graphical user interface of the mobile computing device. In an embodiment illustrated in FIG. 7B, two types of survey icons are displayed: a "GPS" icon 722 and a "Camera" icon 724. The user can select either icon to survey the property to identify and mark locations of mitigatable items.

Figure 7C:
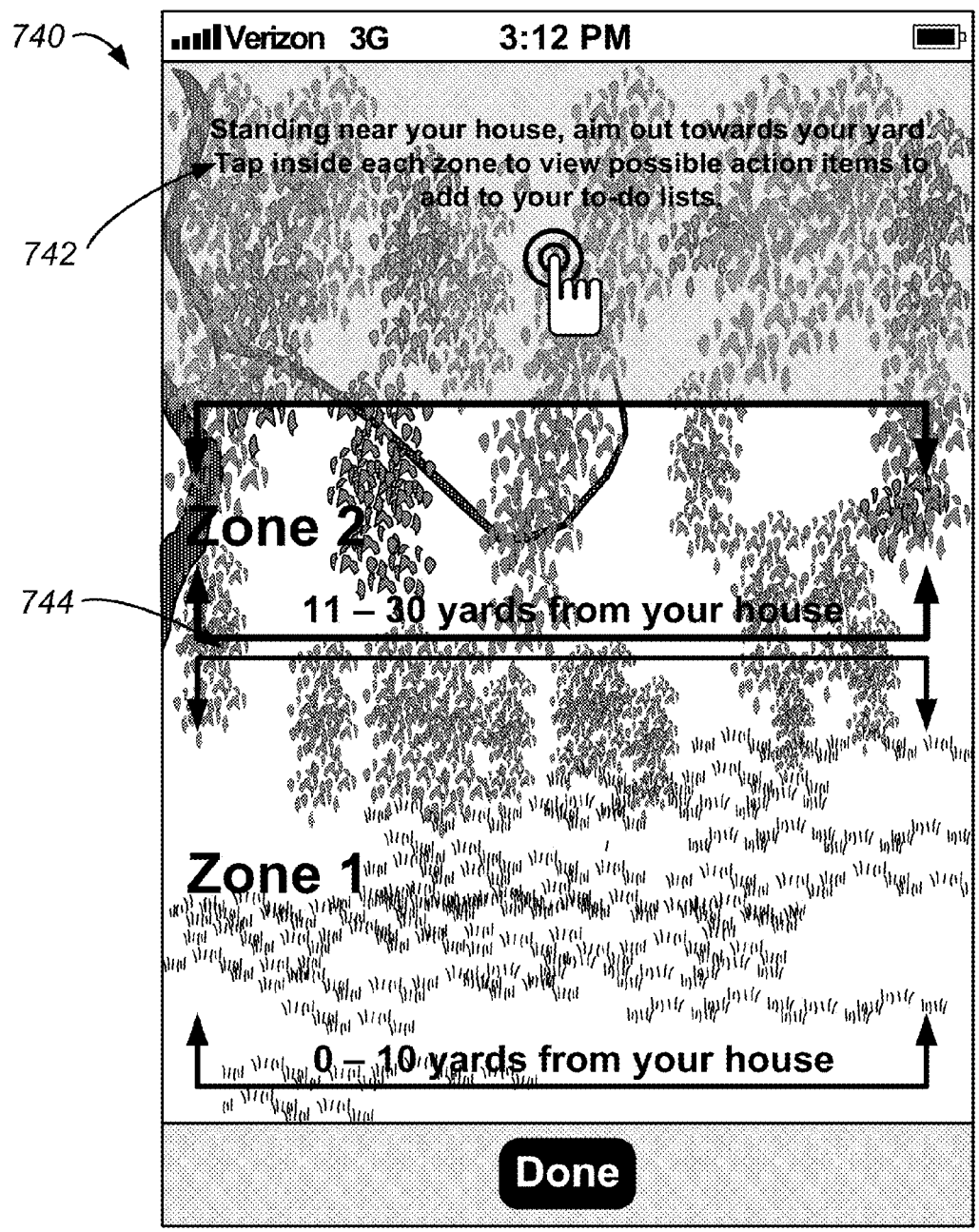
FIG. 7C is a high level schematic diagram illustrating a graphical user interface displaying an augmented view of an image of a yard according to an embodiment of the present invention.

When the "Camera" icon 724 is selected by the user, a page 740 shown in FIG. 7C is displayed on a graphical user interface of the mobile computing device. As shown on page 740, an image of where the camera lens is pointing is displayed on the screen along with an instruction 742 for aiming the camera towards a user's yard. In an embodiment illustrated in FIG. 7C, the real view image is augmented with line markers 744 showing a distance of a target from the house. Zone 1 shows an area in the yard between 0 and 10 yards from the house, and Zone 2 shows an area in the yard between 11-30 yards from the house. The instruction 742 further directs a user to tap inside each zone to view possible action items (e.g., mitigatable items) and to add them to the user's to-do-lists.

Figure 7D:
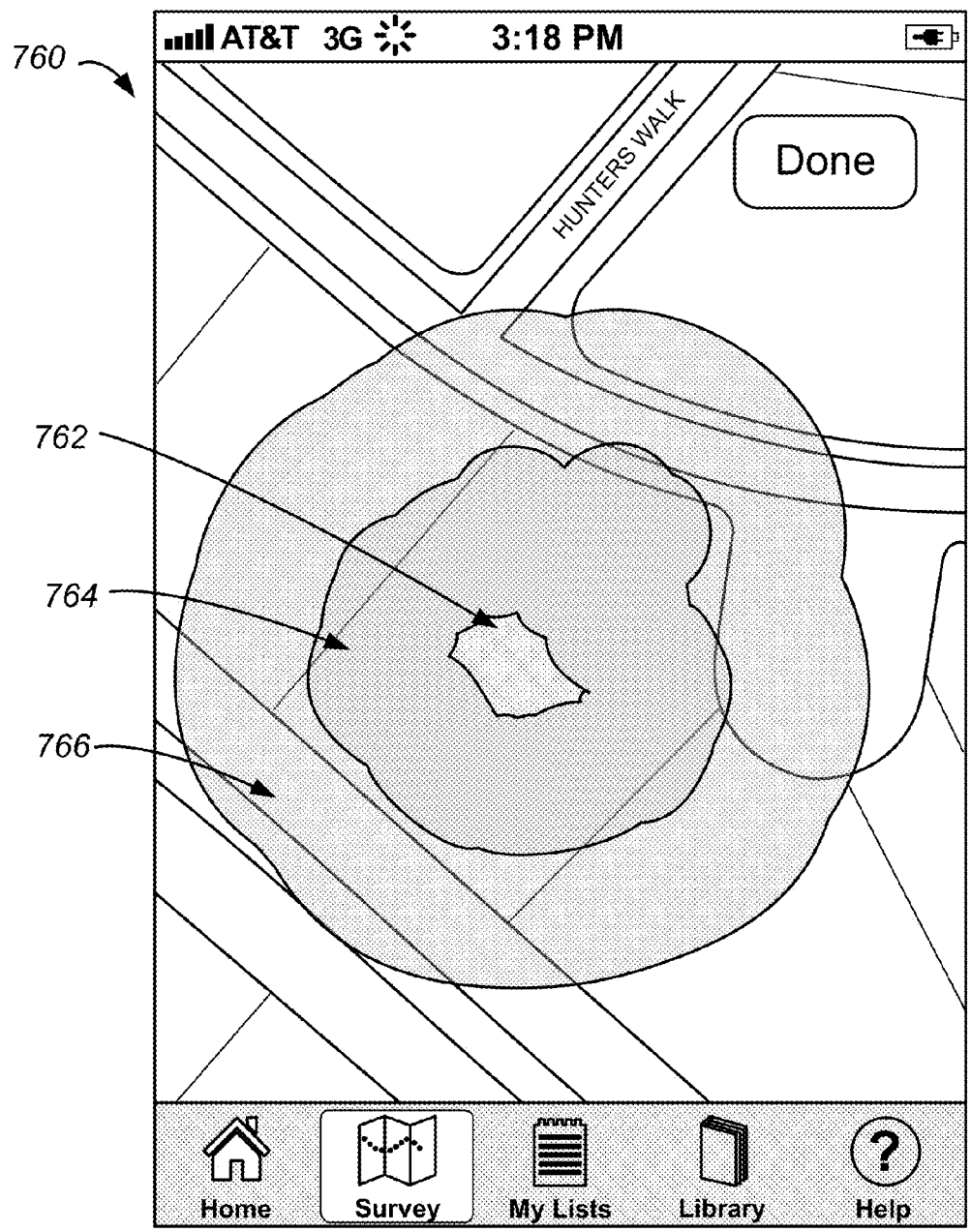
FIG. 7D is a high level schematic diagram illustrating a graphical user interface for displaying an aerial map of real property and its surrounding according to an embodiment of the present invention.

FIG. 7D illustrates a page 760 that displays an aerial map of the property and its surrounding. The property 762 is shown as being surrounded by Zone 1 (764), which is surrounded by Zone 2 (766). Using the camera and/or other sensors described in the present application, mitigatable items can be identified and stored in a memory of the mobile computing device.

Figure 8:
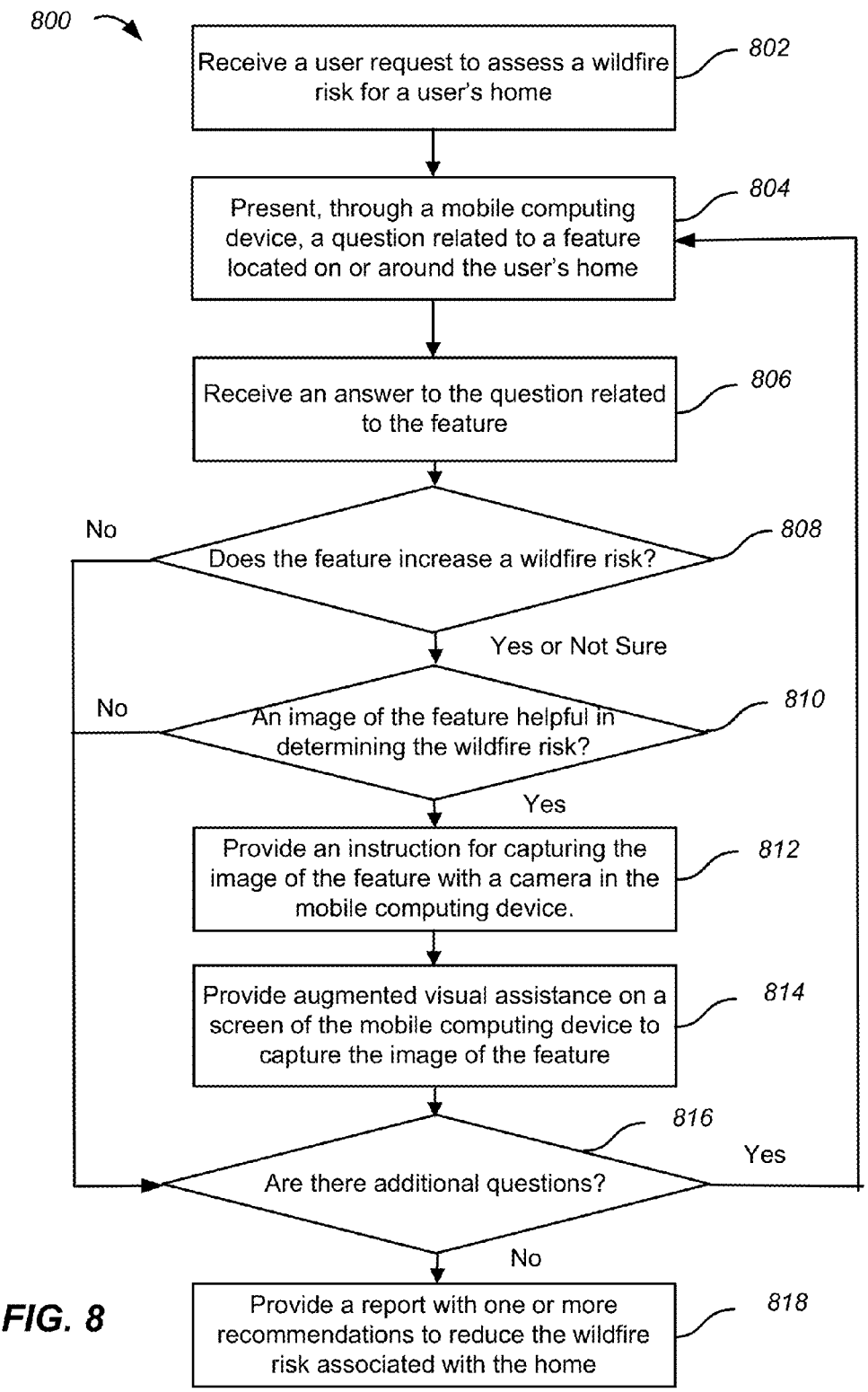
FIG. 8 is a high level flowchart illustrating a method of assessing a wildfire risk associated with a user's home.

FIG. 8—Risk Assessment Based on Inspection List and Augmented Image

FIG. 8 is a high level flowchart illustrating a method performed by a mobile computing device according to another embodiment of the present invention. In an embodiment illustrated in FIG. 8, the method 800 provides, through a mobile computing device, an inspection list in the form of a questionnaire related to features located on or around a user's home to determine a wildfire risk associated with the home (i.e., a risk of home ignition by an approaching fire). Based on answers to the questions, the method determines a wildfire risk associated with the home and provides an inspection report with recommendations to the user.

In FIG. 8, the method includes receiving a user request to assess a wildfire risk for the user's home (802). In an embodiment, the user's request can be received through an application on the mobile computing device or a website. In another embodiment, the request can be made by an insurance company. Upon receiving the user's request, the user's home location (e.g., address) can be input by the user, or it can be determined by GPS location information transmitted by the user's mobile computing device. Alternatively, the home location can be retrieved from a customer database of the insurance management system based on the user's log-in information.

In the method 800, the user is presented with a plurality of questions related to features about the home, yard, and surrounding areas of the home (804). Examples of questions related to the features are illustrated in FIGS. 9A-9F. The presence or absence of certain features on or around the home can affect a wildfire risk associated with the home. Some of the questions are related to features that can be mitigated by the homeowner to reduce a wildfire risk, while other questions are related to features that are considered as risk factors of a wildfire but cannot be mitigated by the homeowner. The total number of questions presented to the user is less than fifty, typically less than thirty, more typically less than twenty, so that a homeowner is more likely to finish inspecting the home within a reasonable amount of time (e.g., 20 minutes).

Based on the home location (e.g., address or zip code) and property details, a set of questions can be dynamically changed. Different regions of the country have different climates, vegetation, and building structures. If it is determined that the home is located in a coastal region with a certain climate, vegetation, and building structures, then a set of questions presented to the homeowner can be dynamically changed to focus on a specific subset of information relevant to the region. The questionnaire can also be dynamically modified according to results of previous inspections performed by others living in the same region as the homeowner. Thus, in embodiments of the present invention, the inspection list or a set of questions shown in FIGS. 9A-9F can be personalized and customized for each individual homeowner.

Upon receiving an answer to each question (806), it is determined whether a homeowner's answer related to the feature increases a wildfire risk associated with the home (808). As an example, a homeowner may be asked, "Does your home have wood or vinyl siding, or any combination including these materials?" If the answer is "no," then a next question is presented to the user until answers to all of the questions are obtained. If the answer is "yes," then it is determined by the data processor, whether an image of a feature associated with the question can assist in determining the wildfire risk associated with the home (810). If the image is not helpful, then a next question is presented to the user (e.g., a question related to whether a window is a single pane or a double pane). If the answer is "not sure," then the answer may be treated as "yes," and it is assumed that the feature inquired in the question may raise a wildfire risk and may require further analysis. Alternatively, additional information related to the feature may be displayed to assist the user in determining the answer to the question.

For features that can be better assessed with images, a user may be prompted to take pictures of the features. An instruction may be provided on how to take a picture for a particular feature relevant to the question in the inspection list (812). The instruction can be a visual instruction displayed on top of a real view image on the screen of the mobile computing device. For example, if the question relates to unmanaged vegetation beyond 100 feet of a home, then the following visual instruction may be displayed on top of a real view image on the screen: "Stand with your back to the home, take a photo which best illustrates the surrounding area." Additionally or alternatively, an audio instruction may be provided for the user in capturing images of features on or around the home.

For some embodiments, augmented visual assistance can be optionally provided on the screen of the mobile computing device through an application (814). In an embodiment, the augmented visual assistance can be provided together with an instruction on the screen of the mobile computing device. The augmented visual assistance can be visual information that can be graphically overlaid on top of a real view image on the screen so that it can be used as a guide for a user to take a proper image of a feature of interest. In an embodiment, on-screen visual assistance can indicate a proper angle and direction to take photos with a camera in the mobile computing device. In other embodiments, the augmented visual assistance can include a compass bearing, a level graphic to show a proper angle and/or distance at which a picture or video should be taken.

In other embodiments, the augmented visual assistance can be in the form of a "magic window" or a graphically augmented assistance window, which has a boundary so that a feature of interest can be fit within the boundary. In an embodiment, the graphically augmented assistance window can be in a shape of a feature or an object to be photographed. For example, if a picture of a gutter is to be taken, then a mobile application in accordance with embodiments of the invention can display a transparent window in the shape of a gutter on the screen of the mobile computing device. On the screen of a mobile computing device, a user can overlay the real view image of the gutter on top of the transparent magic window so that the user can take a picture of the gutter at a proper distance and angle. In another example, the magic window can be a line, a set of lines, or a window that form a boundary that can be used as a guide in capturing an image of a feature of interest.

In another embodiment, any feature or object relevant to the question within a magic window can be automatically detected and identified by a mobile application in accordance with embodiments of the present invention. After identification of an object, a picture can be taken automatically. Alternatively, an alert can be provided for a user to take a picture of the identified object within the magic window.

The data associated with augmented visual assistance or metadata (e.g., compass bearing, a level graphic, angles, or the like) associated with each picture can be stored in the memory of the mobile computing device together with the picture. In some embodiments, the metadata can be overlaid on top of the picture on a computer screen so that the metadata associated with the picture can assist an assessor or a professional inspector can further evaluate the feature.

According to another embodiment of the present invention, the geolocation of a mobile computing device can be used to determine an optimal range of time during the day to take pictures. For example, GPS coordinates of a mobile computing device can be used to calculate the sunrise and sunset times of the location of the mobile computing device. When a user attempts to take pictures through a mobile application outside of the optimal time range (e.g., between sunrise and sunset), a notification can be provided to the user to take assessment pictures within the optimal time range. Alternatively, luminosity of the image captured by the camera can be evaluated by the mobile application, and a user may be notified if the evaluated luminosity indicates that current lighting is not optimal for taking assessment pictures. In an embodiment, a mobile application can block a user from taking photographs outside of the optimal time window since such photographs cannot be utilized to properly evaluate a wildfire risk associated with a home.

Referring to FIG. 8, after an answer and/or an image are obtained, the method further includes determining if there are any remaining questions that are unanswered in the inspection list (816). If it is determined that there are unanswered questions, then the method returns to step (804) to present additional questions. If it is determined that all of the questions in the inspection list are answered, then a notification is provided to the user that the assessment has been completed.

The method 800 can further include an option to provide a report to a user upon request with one or more recommendations to reduce the wildfire risk associated with the home (818). A report can be provided through the user mobile computing device, a website, e-mail, or any other suitable mode of communication. A user can be provided with visual and/or audible feedback. In one embodiment, the report can be categorized according to features assessed during an inspection. If a feature is determined to increase a wildfire risk associated with a home, then a specific recommendation is provided to reduce the risk. For a quick visualization, each inspected feature may be displayed with a flag warning system in the report—for example, a red flag for features that require an immediate attention, a yellow flag for features that require an attention at some time, and a green flag for features that are determined to be relatively fire safe.

After completion of a home inspection, the data collected by a mobile application can be analyzed to determine ratings or rankings of risks uncovered for an inspected property. Any suitable risk scoring algorithm can be applied in embodiments of the present invention. For example, it can be based on binary answers, "yes" or "no," to questions related to presence of objects with relatively high flammability. In some embodiments, if an answer is "not sure," then the answer may be treated as "yes" in terms of risk scoring. In one implementation, a single score can be based on a number of "yes" compared to the total number of questions. In another embodiment, a single score can be based on a number of "yes" and "not sure" (being treated as "yes") compared to the total number of questions. In other embodiments, a risk score can be determined using other methods described in the application, for example, those described in relation to FIG. 4.

In embodiments of the present invention, other risk factors can be determined and incorporated into a risk score. These include, for example, the time of year associated with a wildfire, weather patterns and history, home information, wind directions associated with the home, past claims events, aerial imagery, federal information, tax records, appraisal information, any other visual data on-site, or the like.

A risk score determined by a mobile application or a hazard computation engine of the insurance management system can be used to prioritize its follow-up work with homeowners or for underwriting. In an embodiment, an insurance company can provide a multi-tiered interaction with homeowners based on a risk score—queuing homes to inspect in person or to follow up over the phone. For example, no response or a positive feedback may be provided for homeowners of properties with a low risk score. If the risk score is relatively high, then the insurance company (or through its third party service provider) may provide additional follow-up services, such as a phone call or other means of communication to the homeowner with further recommendations, an in-person inspection, or an additional digital review of the data, followed by a digital response (e.g., a video interaction) to a homeowner.

It should be appreciated that the specific steps illustrated in FIG. 8 provide a particular method of assessing a wildfire risk associated with a home according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

FIGS. 9A-9F—Fire Shield Assessment Questions

FIGS. 9A to 9F illustrate exemplary assessment questions that can be used in the method of determining a wildfire risk associated with a home as described in relation to FIG. 8. The questions illustrated in FIGS. 9A to 9F can be integrated into a mobile application in accordance with embodiments of the present invention to guide a user in inspecting the user's home. Each question relates to a feature or condition associated with structural or environmental aspects of a home or its surrounding. If an answer to a question is "yes," indicating presence of a condition that increases a wildfire risk, then a user is provided a recommendation to improve the condition associated with the home. As illustrated in FIGS. 9A to 9F, for some questions, a user is requested to take a photograph of a feature so that the feature can be further analyzed.

In some embodiments, for each feature or condition, a user can be provided with additional educational material under the heading "Learn More." For example, a user may be educated about a specific condition associated with a home, such as location of snow collection or pile up of leaves. A user can also be provided with a video of educational material related to a condition, or an opportunity for a video chat with an expert about a feature or condition of the user's home in question.

FIGS. 10A-10I—Inspection List Through a Mobile Application

Figure 10A:
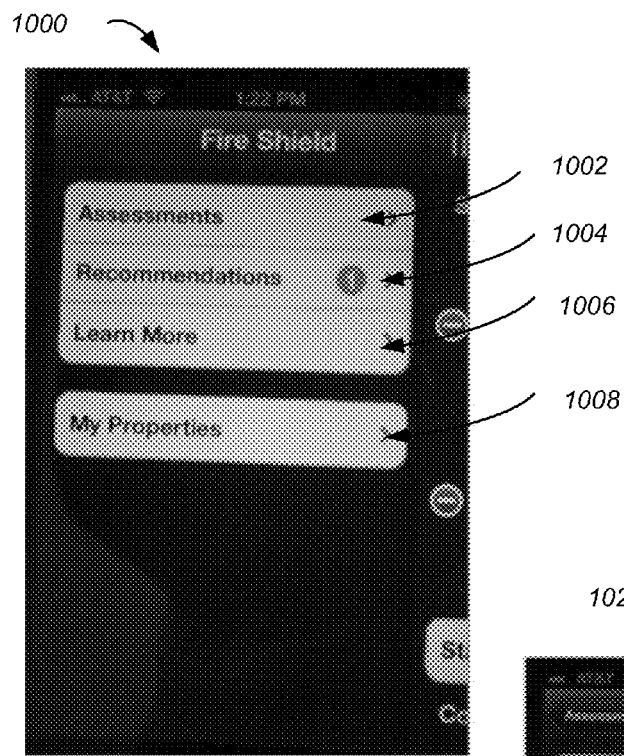
FIGS. 10A to 10I illustrate high level schematic diagrams illustrating a graphical user interface of a mobile computing device for assessing a wildfire risk associated with a home according to an embodiment of the present invention.

FIGS. 10A through 10I are high level schematic diagrams illustrating a graphical user interface that may be used in assessing a wildfire risk associated with a home through a mobile application according to an embodiment of the present invention. FIG. 10A shows a page 1000 of another version of a mobile application called Fire Shield shown on a mobile computing device. The graphical user interface displays a menu that the user can select: "Assessments" 1002, "Recommendations" 1004, and "Learn More" 1006. The graphical user interface also displays a menu "My Properties" 1008 which can have a list of property inspected or to be inspected by a user.

Figure 10B:
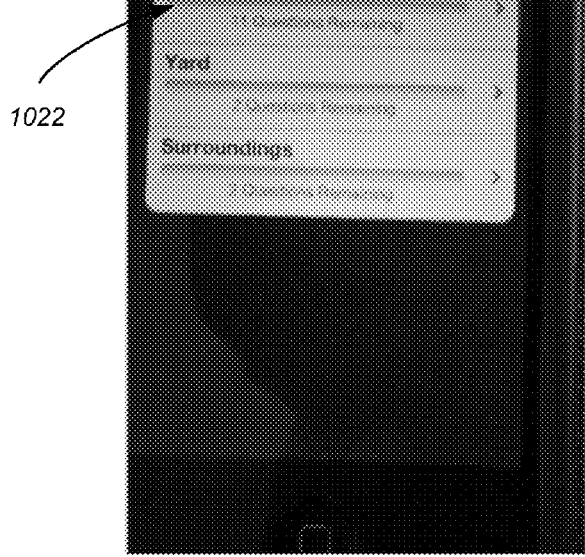

When "Assessments" 1002 shown in FIG. 10A is selected from the menu by a user, an assessments dashboard 1020 shown in FIG. 10B is displayed on a graphical user interface of the mobile computing device. In an embodiment illustrated in FIG. 10B, a user can select inspection questions related to home, yard, or surroundings until all of the questions have been answered by the user.

Figure 10C:
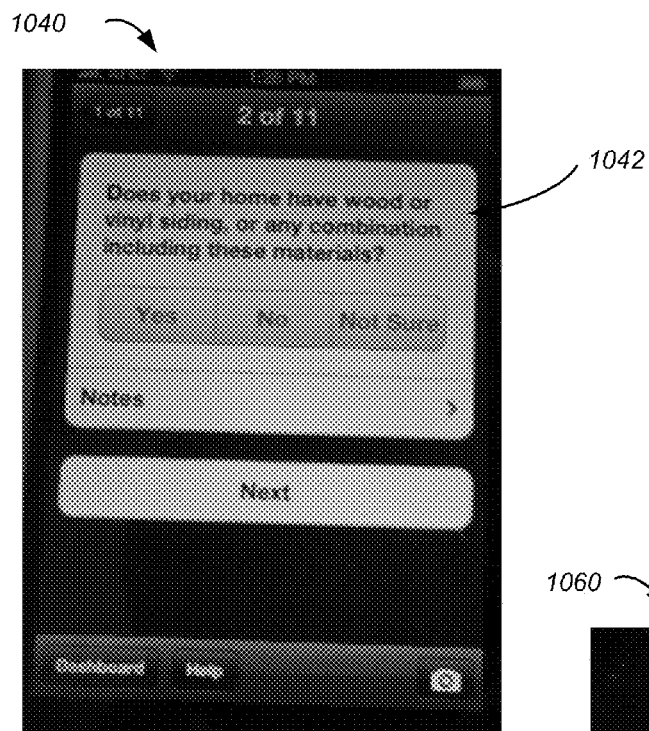
Figure 10D:
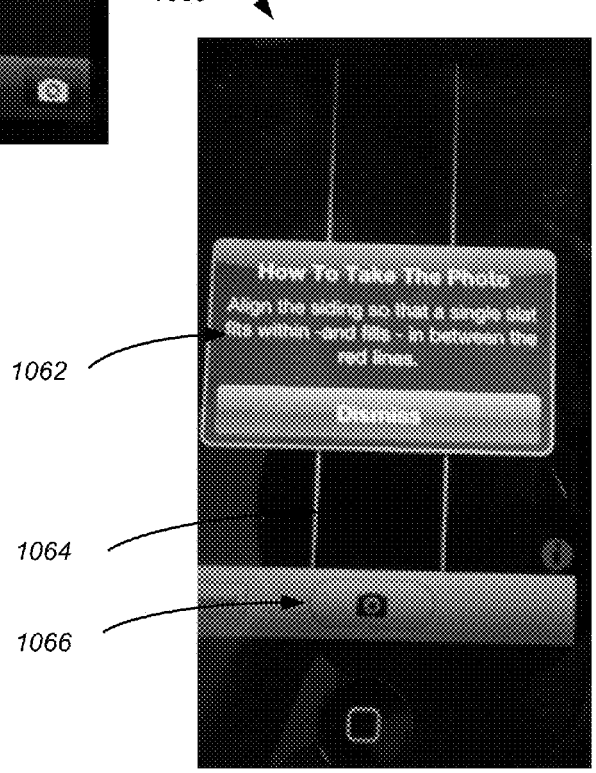

FIG. 10C illustrates a page 1040 of the mobile application that shows one of the questions 1042 related to a home: "Does your home have wood or vinyl siding, or any combination including these materials?" When the user selects "yes" as the answer, then a page 1060 shown in FIG. 10D is displayed on the screen of the mobile computing device. Since presence of wood or vinyl siding raises a wildfire risk associated with a home, a window 1062 with an instruction for taking a photograph is displayed on the screen. The screen also displays augmented visual assistance 1064 that can be used as a guide to take a photograph of the siding so that the captured image can be properly evaluated by a data processor or an expert reviewing the image. After aligning the siding so that a single slat fits within the augmented visual assistance 1064, a camera button 1066 can be selected by a user to take a photograph of the siding for further analysis.

Figure 10E:
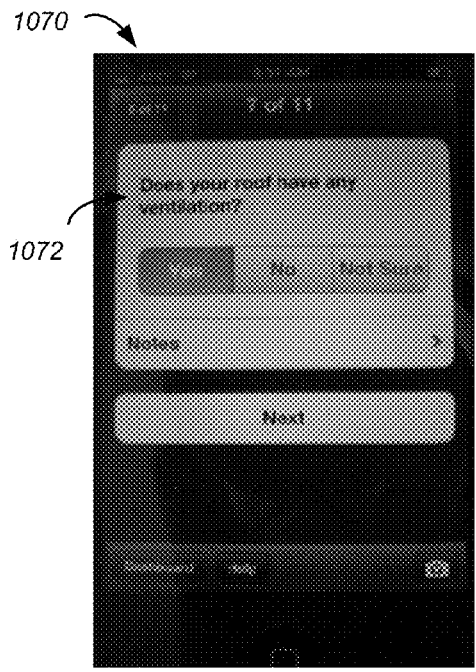
Figure 10F:
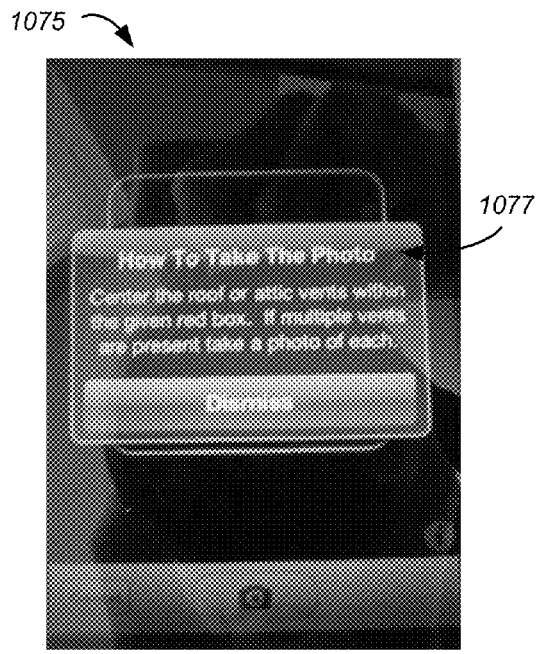
Figure 10G:
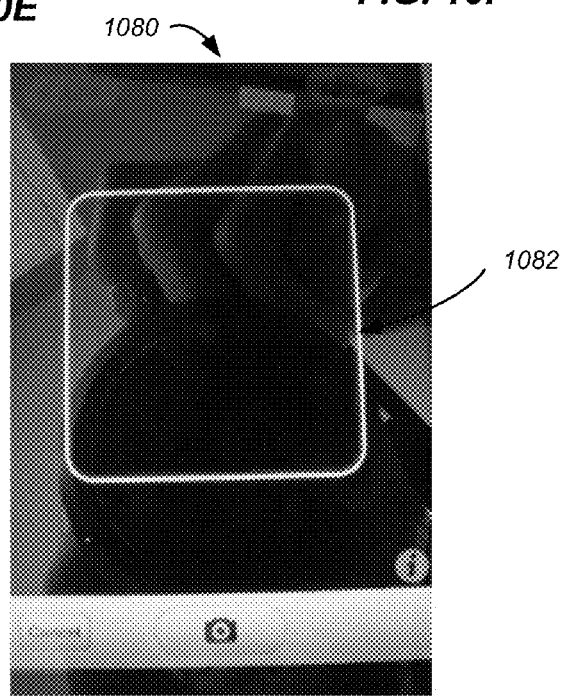

FIG. 10E illustrates a page 1070 on the mobile application that shows one of the questions 1072 related to a roof ventilation. When the user selects "yes" as the answer, then a page 1075 shown in FIG. 10F is displayed on the screen of the mobile computing device. An instruction 1077 on taking the photograph of the roof or attic vents is displayed on the mobile computing device. When the instruction 1077 is dismissed, then a page 1080 shown in FIG. 10G is displayed on the screen. As shown in on the page 1080, augmented visual assistance 1082 in the form of a box window is displayed on the screen so that the roof or attic vents can be centered within the box window.

Figure 10H:
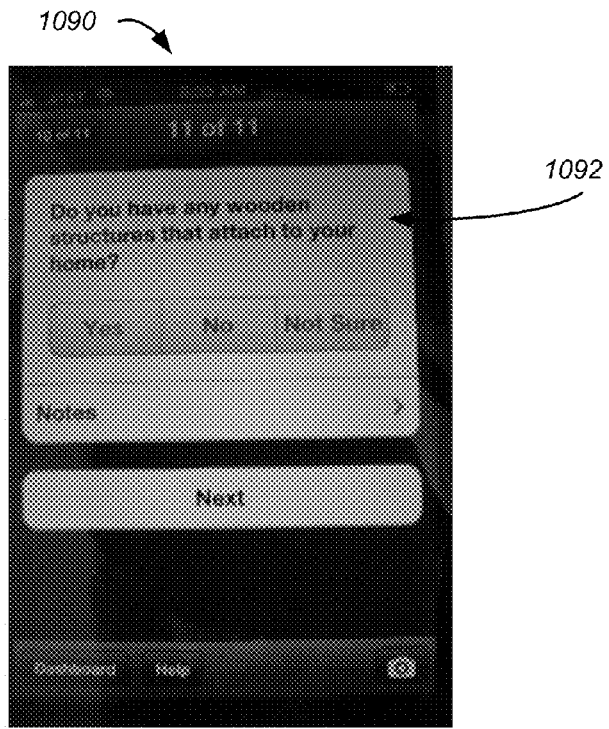
Figure 10I:
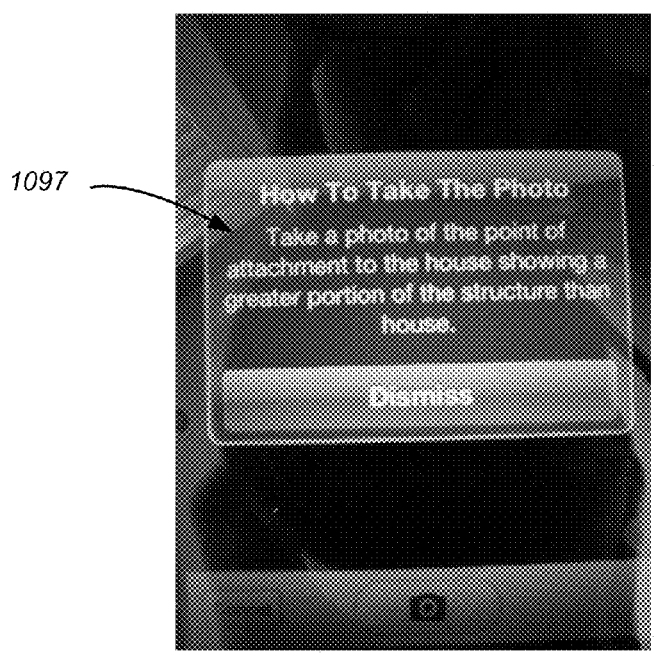

FIG. 10H illustrates a page 1090 of the mobile application that shows one of the questions 1092 related to a wooden structure attached to a home. If the user selects "yes" as the answer, then a page 1095 shown in FIG. 10I is displayed on the screen of the mobile computing device. An instruction 1097 on taking the photograph of the attachment to the house is displayed on the mobile computing device. In the embodiment illustrated in FIG. 10I, the instruction 1097 is provided without any augmented visual assistance.

Figure 11:
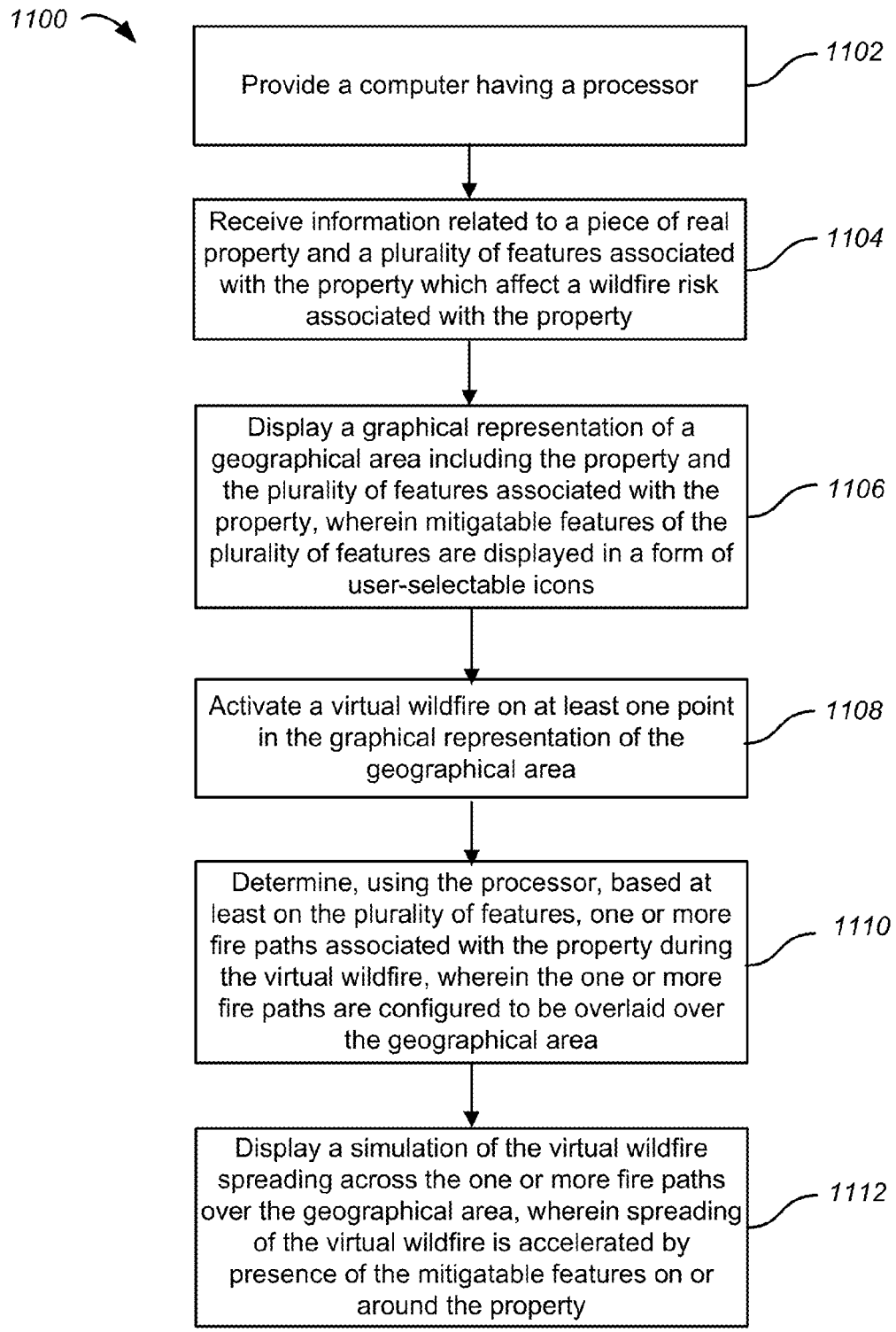
FIG. 11 is a high level flowchart illustrating a virtual game of simulating wildfire behavior according to an embodiment of the present invention.

FIG. 11—Virtual Game of Simulating Wildfire Behavior

According to an embodiment of the present invention, an educational tool for homeowners is provided by recreating a home in a virtual environment as part of a game. Local data obtained from sensors and external data, such as aerial maps, can be used to convert a user's home and its surrounding area into a virtual reality world. Through games in accordance with embodiments of the present invention, a user can be further educated about features on and around a home that enhance a wildfire risk, the effect of mitigating such features, and a potential wildfire behavior around the user's home. Visually illustrating burning of the user's property in a virtual environment can further motivate a user to take an action in removing or modifying the mitigatable features around the property.

FIG. 11 is a high level flowchart illustrating a method of simulating a wildfire behavior according to an embodiment of the present invention. The method 1100 provides a computer having a processor (1102), which can be a user computing device. The method also includes receiving information related to a piece of real property and a plurality of features associated with the property which can affect a wildfire risk associated with the property (1104). The plurality of features can include mitigatable items or non-mitigatable items or features in the vicinity of the property or in a greater area surrounding the property as described in relation to FIGS. 3A to 3C and other figures. In an embodiment, the information can be received as an aerial image of the property and its surrounding area. In another embodiment, the information can be received in the form of local data obtained from sensors and/or external data as described above.

The method 1100 further includes displaying a graphical representation of a geographical area including the property and the plurality of features associated with the property, wherein mitigatable features of the plurality of features are displayed in the form of user-selectable icons (1106). As described above, a mitigatable feature is an object, an item, or a condition that can be removed or modified to reduce a wildfire risk associated with the property. These include, for example, a dry tree within a defensible space zone or a tree limb hanging over the roof. Each of these mitigatable features is represented in the form of a user-selectable icon that can be removed, relocated, or modified by the user.

In the method, a user can select any point in the graphical representation of the geographical area to activate a virtual wildfire (1108). For example, an icon that represents an ember or an icon that presents an approaching wildfire can be selected and placed at any point in the displayed graphical representation of the geographical area. Upon activating a virtual wildfire, one or more fire paths associated with the property can be determined using the processor based at least on the plurality of features on and around the property (1110). Fire paths can be determined by an algorithm using the local data captured by sensors and the external data associated with the property. The fire paths, configured to be overlaid over the geographical area, can illustrate a potential direction and speed at which a wildfire will approach to ignite a home.

Upon activating a virtual wildfire, the method includes displaying, on a screen of the user computing device, a simulation a virtual wildfire spreading across one or more fire paths over the geographical area, where spreading of the wildfire is accelerated by presence of mitigatable features on or around the property (1112). The weakest points of the property in relation to an approaching wildfire can be visually illustrated through the simulation.

In an embodiment, a user has an option to select one or more icons, each representing a mitigatable feature on or around the user's property, and to remove or modify the selected feature from the graphical representation. If the user chooses to remove one or more mitigatable features (e.g., trees, shrubs, debris, or the like) by selecting icons corresponding to such features, then a new graphical representation of a geographical area including the property can be re-displayed without the selected mitigatable feature. Alternatively, a mitigatable feature can be relocated or modified to reduce a wildfire risk associated with the home. Upon removing or modifying one or more mitigatable features, spreading of a virtual wildfire can be re-simulated to visually illustrate a change in a wildfire behavior. The difference between the two simulations (before and after mitigation) can be displayed to motivate a homeowner to take mitigating action.

While FIG. 11 illustrates a virtual reality game as a tool to educate a homeowner, any suitable games may be provided for users. For example, a game in accordance with embodiments of the present invention can include questions and answers that are tied to inspection checklists illustrated in, for example, FIGS. 3B-3C and FIGS. 9A-9F. In another embodiment, the method further includes a simulated evacuation game. A player in the game can be provided with a time limit to gather personal belongings during a virtual wildfire simulation. Points can be assigned to specific personal items. For example, higher points can be assigned for non-replaceable items such as family heirlooms, and lower points can be assigned for replacement items such as televisions. Through a simulated evacuation game according to an embodiment of the present invention, players can learn and design a clear plan and a list of important items to gather before an evacuation.

Figure 12:
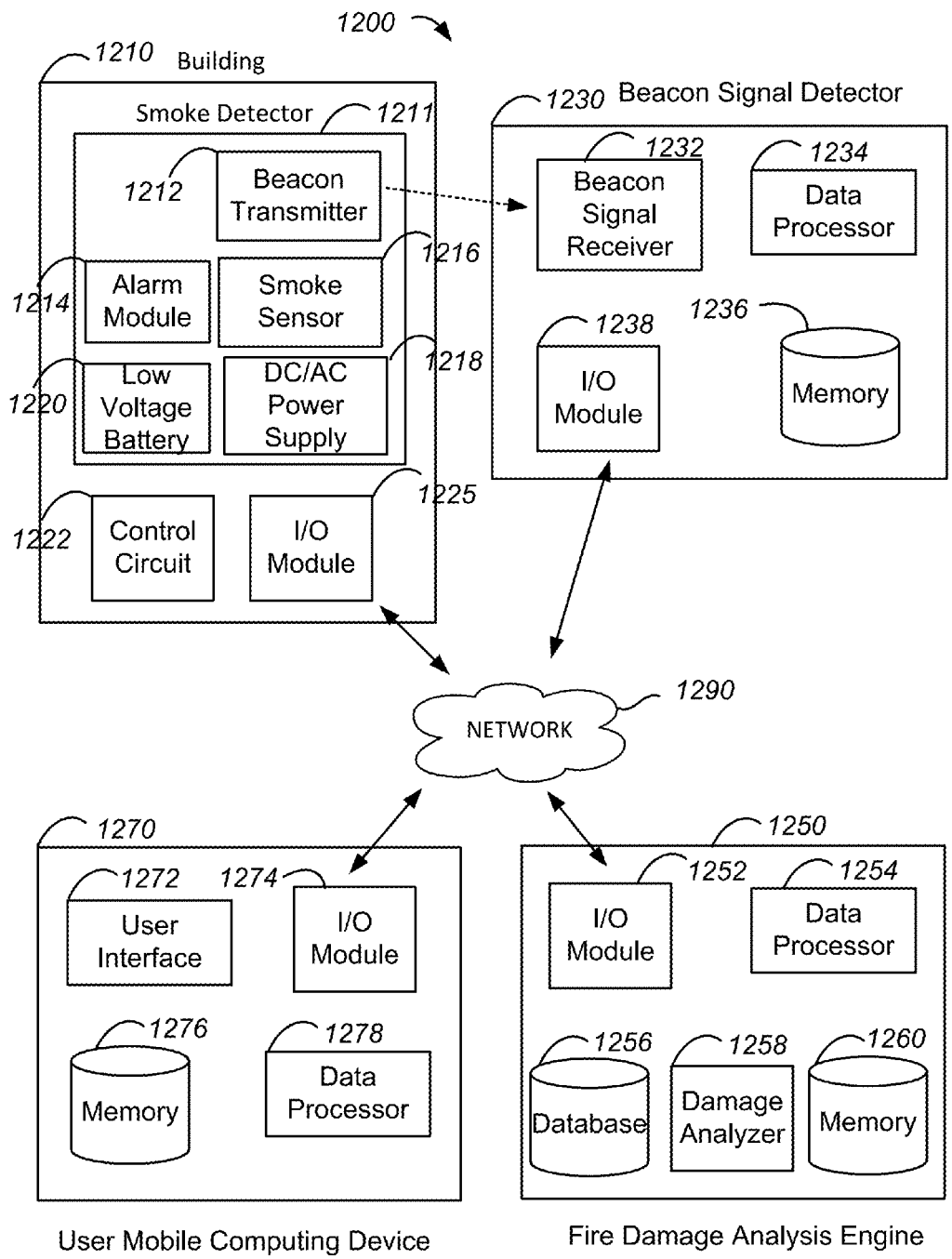
FIG. 12 is a high level schematic diagram illustrating an interaction of a smoke detector at a building with a beacon signal detector, a fire damage analysis engine, and a user mobile computing device according to an embodiment of the present invention.
Figure 13:
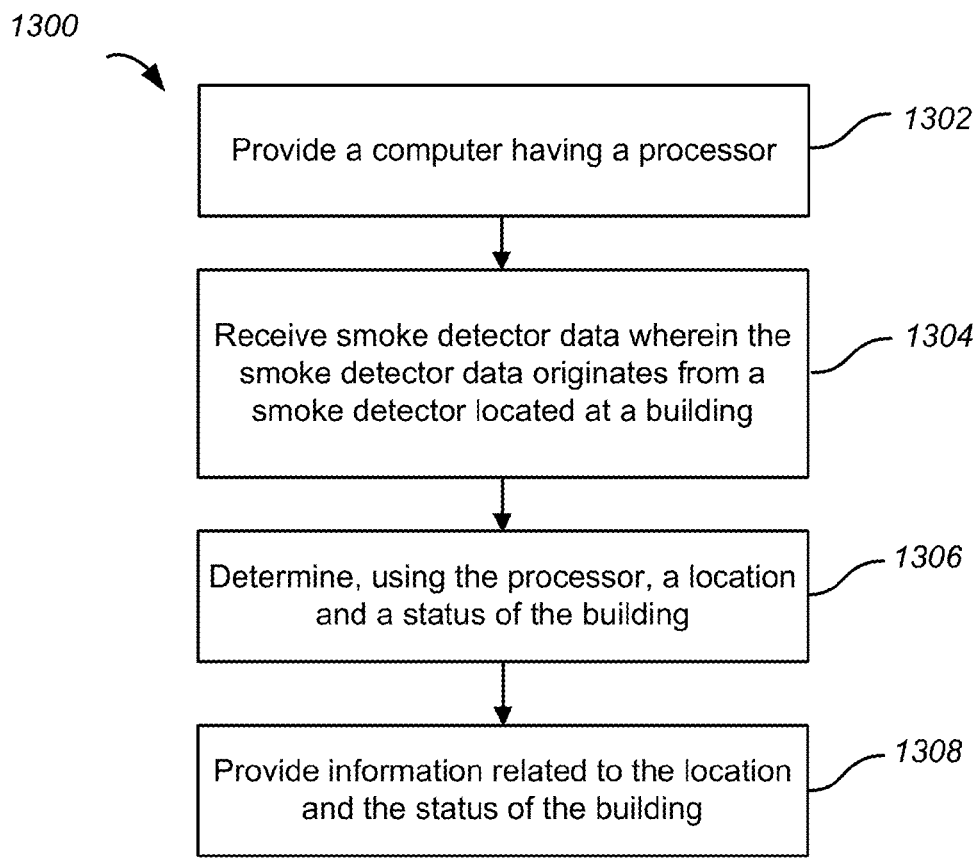
FIG. 13 is a high level flowchart illustrating a method of receiving and analyzing smoke detector data according to an embodiment of the present invention.

FIGS. 12 and 13—Smoke Detector with a Beacon

In another embodiment of the present invention, computer-implemented methods and systems allow homeowners to learn the status of their homes in real-time during an active fire. Firefighters, when working on fires, are constantly barraged with requests from homeowners for an update on the status of their homes. This is a daunting task for firefighters because their primary duty is to fight fires and to save lives and homes. Furthermore, house numbers can be difficult to read during a fire due to debris and fire damage to homes. Embodiments of the present invention provide computer-implemented methods and systems for automating updates of home status during an active fire.

FIG. 12 is a high level schematic diagram illustrating a building status analysis system 1200 according to an embodiment of the present invention. The building status analysis system 1200 includes a building 1210, a beacon signal detector 1230, a fire damage analysis engine 1250, and a user mobile computing device 1270. The beacon signal detector 1230 is an apparatus typically carried by firefighters or is located in a fire truck during a fire so that it can receive a beacon via wireless signal, such as radio frequency signal, from smoke detectors located inside buildings in the area. The fire damage analysis engine 1250 is generally located at a remote location away from the fire.

In an embodiment illustrated in FIG. 12, the building 1210 includes a smoke detector 1211 which can have a number of components: a beacon transmitter 1212, an alarm module 1214, a smoke sensor 1216, a DC/AC power supply 1218, and a low voltage battery 1220, operatively coupled together and controlled by a control circuit 1222. The smoke sensor 1216 detects smoke, which typically indicates that there is a fire in the building. Once the level of smoke reaches above a threshold, it can activate the alarm module 1214, which, in turn, generates audible and/or visible alarm from the smoke detector. The beacon transmitter 1212 in the smoke detector 1211 can broadcast a beacon via radio signal in an unregulated space over a relative short distance. In one embodiment, the beacon transmitter is triggered once the level of smoke detected by the smoke sensor reaches above a threshold. In another embodiment, the beacon transmitter can transmit a radio signal regardless of the status of the smoke sensor. The beacon transmitter can transmit a continuous or periodic radio signal with limited information content, such as its identification, location of the building, or its status. The components of the smoke detector 1211 can be powered by the DC/AC power supply 1217 during a normal operation. In the event of a power outage (which can occur during a fire), the smoke sensor, the alarm module, and the beacon transmitter can be powered by the low voltage battery 1220 (e.g., 9-volt battery).

While not illustrated in FIG. 12, the smoke detector 1211 can include a number of other components, such as a heat sensor, a directional smoke sensor, an image sensor, a motion sensor, or the like. These components can generate additional smoke detector data from the smoke detector. For example, the image sensor can include a still or video camera that can capture images to show last moments of operation or interval moments. The image sensor in the smoke detector can provide a live view to the user computing device (e.g., a smartphone) through the network 1290. The homeowner or its insurance provider can determine through the live view whether the fire has entered the building. In some embodiments, rather than providing a continuous feed of vide or images, the image sensor may be activated by motion sensors to capture video or images. The motion activation of the image sensor can reduce drainage of the low voltage battery. The captured video and images may provide a level of security against looters for the homeowners who have been evacuated. The video and images can also be used to notify authorities of illegal activities. In other embodiments of the present invention, the directional smoke sensor and heat sensor can provide information related to a location of heat or fire within the building, which can be used to dispatch firefighters or wildfire professionals more effectively. Therefore, the smoke detector can generate and broadcast various smoke detector data including: an identification or location of a building, the status of the building (e.g., entry of fire, motion detection, looting activities, or the like) data related to the status of the battery (e.g., the level of battery life), temperature recordings at various intervals, smoke particulate volumes and counts, signal received from outside provider devices, or other status of the building.

While the building 1210 is still powered by the electrical power, various components in the smoke detector 1211 can be networked using wired or wireless technology to integrate the smoke detector data generated from the components within the smoke detector 1211. Then the smoke detector data from the smoke detector 1211 can be transmitted through an I/O module 1225 located within the building. As shown in FIG. 12, the smoke detector data from the smoke detector 1211 can be transmitted through network 1290 to the user mobile computing device 1270. As shown in FIG. 12, the mobile computing device 1270 can have a user interface 1272, an I/O module 1274, a memory 1276, and a data processor 1218, which are described in relation to FIG. 2. A homeowner with the mobile computing device 1270 can be at an off-site location, and can review smoke detector data. Alternatively or additionally, the smoke detector data can be transmitted through the network to the fire damage analysis engine 1250 (which may be operated by an insurance company or a wildfire service company), which, in turn, can transmit information to the user computing device.

After a power outage, the smoke detector can be powered by the low voltage battery 1220. When the smoke detector is powered by the low voltage battery, only the components that require a relatively low power supply (e.g., beacon transmitter, smoke sensor, smoke alarm, motion sensor, or the like) may be powered. Other components, such as an image sensor, may not be powered by the low voltage battery to conserve the power supply. In some embodiments, the image sensor may be powered by the low voltage battery when it is coupled to and activated by motion sensors. The motion activation of the image sensor can conserve the low voltage battery life. After the power outage, the I/O module 1225 may not be operational, and any smoke detector data, such as a beacon via radio signal from the smoke detector, is transmitted via the beacon transmitter 1212 over a relatively short distance. The smoke detector data from the beacon transmitter, in turn, can be detected by the beacon signal detector 1230 carried by firefighters in the area.

The beacon signal detector 1230 includes a beacon signal receiver 1232 (which can detect and receive a signal from the beacon transmitter 1212), a data processor 1234, a memory 1236, and an I/O module 1238. In embodiments of the present invention, the beacon signal detector 1230 can be integrated into a smartphone or other devices. Alternatively, it can be a separate apparatus. Once the smoke detector data is received by the beacon signal detector, it can be transmitted to other computers at a remote location via the I/O module 1238 through the network 1290, where the data can be viewed by homeowners or the insurance company. The absence of a beacon from a building would suggest that the building has been destroyed by the fire.

Once the beacon signal detector 1230 collects the radio signal from buildings in the area, the signal can be transmitted to the fire damage analysis engine 1250 at a remote location through the network 1290. In an embodiment, the smoke detector data received through an I/O module 1252 of the fire damage analysis engine 1250 can be analyzed by a damage analyzer 1258 and a data processor 1254 to determine the location from which the smoke detector data is generated and the status of the building. The processed information can be stored in a memory 1260 or in a database 1256. In some embodiments, the collected radio signal can be processed by the data processor of the beacon signal detector 1230 to determine the location of the signal and the status of buildings. The processed information from the collected smoke detector data can be posted on a central website operated by an insurance company or wildfire service company. Homeowners can use their mobile computing device 1270 to view the information on the central website to determine if their homes are still standing.

In the embodiment illustrated in FIG. 10, the beacon transmitter 1212 is included in the smoke detector 1211. However, embodiments of the present invention are not limited to a beacon transmitter integrated in a smoke detector. A beacon transmitter in a separate housing from the smoke detector can be utilized in embodiments of the present invention. In addition, although FIG. 12 illustrates a single network 1290, a plurality of networks may be used for communication between apparatuses shown in FIG. 12.

FIG. 13 is a high level flowchart illustrating a method of providing data from smoke detectors according to an embodiment of the present invention. The method 1300 includes providing a computer having a processor (1302). In an embodiment, the computer may be provided in the form of the fire damage analysis engine 1350, operated by an insurance company or wildfire service company illustrated in FIG. 12. The method includes receiving smoke detector data wherein the smoke detector data originates from a smoke detector located at a building (1304). The smoke detector data can include identification information related to the smoke detector, its location, smoke particulate counts, a direction of heat or smoke, the battery level, or other status of the building.

In one embodiment, the smoke detector data can be received at the computer directly from smoke detectors when the electrical power supply is intact. In another embodiment, when there is a power outage in the area due to an active fire, smoke detector data from smoke detectors (e.g., a beacon via radio frequency signal) located in a plurality of buildings in the area can be received by a beacon signal detector which may be carried by firefighters on duty in the area.

The method 1300 further includes determining by the processor a location and a status of the building (1306). The location of the building can be a street address at which the building is located. The status of the building can include a likelihood that the building has burned down during a fire. For example, when there is absence of smoke detector data, such as a beacon signal, originating from a smoke detector at a particular building, then it may be determined that the building has been damaged or destroyed by the fire.

In some embodiments, the method also includes determining other information from the smoke detector data. These can include smoke particulate counts, a direction of heat or smoke, a battery level, or the like. The smoke detector data from smoke detectors located at a plurality of buildings in the area can be analyzed to determine the overall neighborhood status of buildings based on feedback from the beacon signal data. The analysis can provide fire crews and insurance providers a way to determine a number of homes or neighborhoods at risk, the direction of the fire, and effective means to dispatch firefighter crews.

Upon determining the location and status of the building, the information related to the building can be provided to a user in real-time (1308). In one embodiment, the information can be displayed on a website operated by the fire damage analysis engine 1250. The location of buildings and their status can be updated continuously or periodically, and the updated information can be posted on the website. In another embodiment, if the homeowners are registered customers of an insurance company or wildfire service company, operating the fire damage analysis engine 1250, the information related to the status of the building can be transmitted to a user mobile computing device (e.g., smartphone) via any suitable mode of communication, such as an e-mail, text, mobile application, or the like.

It should be appreciated that the specific steps illustrated in FIG. 13 provide a particular method of providing data from smoke detectors according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple substeps that may be performed in various sequences as appropriate to the individual step. Furthermore, additional steps may be added or removed depending on the particular applications. One of ordinary skill in the art would recognize many variations, modifications, and alternatives.

FIG. 6—Computer System

FIG. 6 is a high level block diagram illustrating a computer system including instructions to perform any one or more of the methodologies described herein. A system 600 includes a computer 610 connected to a network 230. The computer 610 includes a processor 620 (also referred to as a data processor), a storage device 622, an output device 624, an input device 626, and a network interface device 628, all connected via a bus 630. The processor 620 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 620 executes instructions and includes that portion of the computer 610 that controls the operation of the entire computer. Although not depicted in FIG. 6, the processor 620 typically includes a control unit that organizes data and program storage in memory and transfers data and other information between the various parts of the computer 610. The processor 620 receives input data from the input device 626 and the network 230 reads and stores code and data in the storage device 622 and presents data to the output device 624.

Although the computer 610 is shown to contain only a single processor 620 and a single bus 630, the disclosed embodiment applies equally to computers that may have multiple processors and to computers that may have multiple busses with some or all performing different functions in different ways.

The storage device 622 represents one or more mechanisms for storing data. For example, the storage device 622 may include read-only memory (ROM), random access memory (RAM), magnetic disk storage media, optical storage media, flash memory devices, and/or other machine-readable media. In other embodiments, any appropriate type of storage device may be used. Although only one storage device 622 is shown, multiple storage devices and multiple types of storage devices may be present. Further, although the computer 610 is drawn to contain the storage device 622, it may be distributed across other computers, for example on a server.

The storage device 622 includes a controller (not shown in FIG. 6) and data items 634. The controller includes instructions capable of being executed on the processor 620 to carry out the methods described more fully throughout the present specification. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 622 may also contain additional software and data (not shown), which is not necessary to understand the invention.

Although the controller and the data items 634 are shown to be within the storage device 622 in the computer 610, some or all of them may be distributed across other systems, for example on a server and accessed via the network 230.

The output device 624 is that part of the computer 610 that displays output to the user. The output device 624 may be a liquid crystal display (LCD) well-known in the art of computer hardware. But, in other embodiments the output device 624 may be replaced with a gas or plasma-based flat-panel display or a traditional cathode-ray tube (CRT) display. In still other embodiments, any appropriate display device may be used. Although only one output device 624 is shown, in other embodiments any number of output devices of different types, or of the same type, may be present. In an embodiment, the output device 624 displays a user interface.

The input device 626 may be a keyboard, mouse or other pointing device, trackball, touchpad, touch screen, keypad, microphone, voice recognition device, or any other appropriate mechanism for the user to input data to the computer 610 and manipulate the user interface previously discussed. Although only one input device 626 is shown, in another embodiment any number and type of input devices may be present.

The network interface device 628 provides connectivity from the computer 610 to the network 230 through any suitable communications protocol. The network interface device 628 sends and receives data items from the network 230.

The bus 630 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 610 may be implemented using any suitable hardware and/or software, such as a personal computer or other electronic computing device. Portable computers, laptop or notebook computers, PDAs (Personal Digital Assistants), mobile phones, pocket computers, tablets, appliances, telephones, and mainframe computers are examples of other possible configurations of the computer 610. For example, other peripheral devices such as audio adapters or chip programming devices, such as EPROM (Erasable Programmable Read-Only Memory) programming devices may be used in addition to, or in place of, the hardware already depicted.

The network 230 may be any suitable network and may support any appropriate protocol suitable for communication to the computer 610. In an embodiment, the network 230 may support wireless communications. In another embodiment, the network 230 may support hard-wired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be any appropriate cellular data network or cell-based radio network technology. In another embodiment, the network 230 may be an IEEE 802.11 wireless network. In still another embodiment, the network 230 may be any suitable network or combination of networks. Although one network 230 is shown, in other embodiments any number of networks (of the same or different types) may be present.

A user computer 250 can interact with computer 610 through network 230. The user computer 250 includes a processor 252, a storage device 254, and an input/output device 256. The description related to processor 620 and storage device 622 is applicable to processor 252 and storage device 254. As an example, the user computer 250 can be a personal computer, laptop computer, or the like, operated by a member of a membership organization (e.g., the present assignee). Using the user computer 250, the member can then interact with computer 610 operated by the present assignee through network 230 in order to access the present assignee's web pages or the like.

The embodiments described herein may be implemented in an operating environment comprising software installed on any programmable device, in hardware, or in a combination of software and hardware. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method performed by a processor of a mobile computing device for providing home inspections, the method comprising:
    receiving, at the mobile computing device, a request from a user to assess a wildfire risk associated with a home;
    presenting, through the mobile computing device, a plurality of questions related to features on or around the home;
    receiving, from the user, answers to the plurality of questions, wherein for each of the answers,
        determining, using the processor, whether an image of each of the features associated with each of the answers assists in analyzing the wildfire risk associated with the home; and
        upon determining that the image assists in analyzing the wildfire risk, providing an instruction to the user to capture the image of the each of the features using a camera in the mobile computing device;
    receiving one or more images of the features on or around the home captured by the user; and
    determining, using the processor, at least based on the answers to the plurality of questions and the one or more of images of the features, the wildfire risk associated with the home.

2. The method of claim 1 further comprising displaying a report with recommendations for reducing the wildfire risk associated with the home.

3. The method of claim 2 wherein the report includes a flag warning system for each of the inspected features.

4. The method of claim 1 further comprising providing augmented visual assistance for the user in capturing the image of the each of the features using the camera.

5. The method of claim 4 wherein the augmented visual assistance comprises a transparent window with a boundary for the each of the features to be captured by the camera.

6. The method of claim 1 wherein the plurality of questions relate to exterior features of the home, features in a yard, and features in surroundings of the home.

7. The method of claim 1 further comprising:
    determining, using the processor, a geographic location of the home;
    tailoring the plurality of questions using the geographic location of the home.

8. The method of claim 1 further comprising:
    determining, using the processor, a geographic location of the home;
    determining, using the processor, an optimal time range for capturing the one or more images based on the geographic location of the home; and communicating to the user to capture the one or more images during the optimal time range.

9. The method of claim 1 wherein at least one of the features is mitigatable and wherein the report further comprises a mitigation procedure for removing or modifying a mitigatable feature.

10. The method of claim 1 wherein the method is performed through an application downloaded to a memory of the mobile computing device.

11. The method of claim 1 further comprising:
determining, using the processor, that the wildfire risk associated with the home is less than a threshold; and
issuing an insurance policy for the home with an insurance premium.

12. A non-transitory computer-readable storage medium comprising a plurality of computer-readable instructions tangibly embodied on the computer-readable storage medium, which, when executed by a processor, provide home inspections, the plurality of instructions comprising:
instructions that cause the processor to receive, at the mobile computing device, a request from a user to assess a wildfire risk associated with a home;
instructions that cause the processor to present, through the mobile computing device, a plurality of questions related to features on or around the home;
instructions that cause the processor to receive from the user, answers to the plurality of questions, wherein for each of the answers, causing the processor to
determine whether an image of each of the features associated with each of the answers assists in analyzing the wildfire risk associated with the home; and
upon determining that the image assists in analyzing the wildfire risk, provide an instruction to the user to capture the image of the each of the features using a camera in the mobile computing device;
instructions that cause the processor to receive one or more images of the features on or around the home; and
instructions that cause the processor to determine, at least based on the answers to the plurality of questions and the one or more of images of the features, the wildfire risk associated with the home.

13. The non-transitory computer-readable storage medium of claim of 12 wherein the plurality of instructions are configured to be downloaded as an application on the mobile computing device.

14. A method of providing a virtual reality game for simulating a fire behavior, the method comprising:
providing a computer having a processor;
receiving information related to a piece of real property and a plurality of features associated with the property which affect a wildfire risk associated with the property;
displaying a graphical representation of a geographical area including the property and the plurality of features associated with the property, wherein mitigatable features of the plurality of features are displayed in a form of user-selectable icons;
activating a virtual wildfire on at least one point in the graphical representation of the geographical area;
determining, using the processor, based at least on the plurality of features, one or more fire paths associated with the property during the virtual wildfire, wherein the one or more fire paths are configured to be overlaid over the geographical area; and
displaying a simulation of the virtual wildfire spreading across the one or more fire paths over the geographical area, wherein spreading of the virtual wildfire is accelerated by presence of the mitigatable features associated with the property.

15. The method of claim 14 further comprising:
receiving a user selection of one or more of the user-selectable icons corresponding to one or more of the mitigatable features;
removing or modifying the one or more of the mitigatable features associated with the one or more of the user-selectable icons in the graphical representation of the geographical area;
re-activating the virtual wildfire at the one or more points in the fire paths; and
displaying a re-simulation of spreading of the virtual wildfire across the one or more fire paths over the geographical area.

* * * * *